(12) United States Patent
Oda et al.

(10) Patent No.: US 10,852,895 B2
(45) Date of Patent: *Dec. 1, 2020

(54) SENSOR CONTROLLER, POSITION INDICATOR, AND POSITION DETECTING SYSTEM

(71) Applicant: Wacom Co., Ltd., Saitama (JP)

(72) Inventors: Yasuo Oda, Saitama (JP); Sadao Yamamoto, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,451

(22) Filed: Oct. 21, 2019

(65) Prior Publication Data

US 2020/0050290 A1 Feb. 13, 2020

Related U.S. Application Data

(63) Continuation of application No. 15/885,442, filed on Jan. 31, 2018, now Pat. No. 10,452,168, which is a
(Continued)

(51) Int. Cl.
*G06F 3/044* (2006.01)
*G06F 3/03* (2006.01)
(Continued)

(52) U.S. Cl.
CPC .............. *G06F 3/0442* (2019.05); *G06F 3/03* (2013.01); *G06F 3/038* (2013.01); *G06F 3/0383* (2013.01);
(Continued)

(58) Field of Classification Search
CPC ........................ G06F 3/03545; G06F 3/0383
(Continued)

(56) References Cited

U.S. PATENT DOCUMENTS 7,084,860 B1 8/2006 Jaeger et al.
10,331,235 B2 6/2019 Fleck
(Continued)

FOREIGN PATENT DOCUMENTS

JP 5-316573 A 11/1993
JP 2007-531938 A 11/2007
(Continued)

OTHER PUBLICATIONS

Extended European Search Report, dated Mar. 13, 2019, for European Application No. 16836828.01-1216 / 3340018, 87 pages.
(Continued)

*Primary Examiner* — Koosha Sharifi-Tafreshi
(74) *Attorney, Agent, or Firm* — Seed IP Law Group LLP

(57) ABSTRACT

A sensor controller is provided for use in a position detector for detecting a position of a position indicator on a touch surface. The sensor controller includes a microprocessor for outputting a value of a symbol to be sent to the position indicator. The sensor controller includes a transmitter coupled to the microprocessor for generating a transmission signal including a chip string CN1 produced by cyclically shifting a code string PNa having autocorrelation characteristics by a shift quantity based on the value of the symbol to be sent, and sending the generated transmission signal to the position indicator via the touch surface. A higher bit rate can be obtained for a given chip rate compared with the prior art in which only 1 bit can be expressed by one code string.

11 Claims, 13 Drawing Sheets

Related U.S. Application Data continuation of application No. 15/880,106, filed on Jan. 25, 2018, now Pat. No. 10,627,928, which is a continuation of application No. PCT/JP2016/062325, filed on Apr. 19, 2016.

(60) Provisional application No. 62/207,257, filed on Aug. 19, 2015.

(51) Int. Cl.
*G06F 3/041* (2006.01)
*G06F 3/0354* (2013.01)
*G06F 3/038* (2013.01)

(52) U.S. Cl.
CPC .......... *G06F 3/03545* (2013.01); *G06F 3/041* (2013.01); *G06F 3/0441* (2019.05); *G06F 3/0446* (2019.05); *G06F 3/04162* (2019.05)

(58) Field of Classification Search
USPC ....................................................... 345/179
See application file for complete search history.

(56) References Cited

U.S. PATENT DOCUMENTS

| | | |
|---|---|---|
| 2007/0177533 A1 | 8/2007 | Palay et al. |
| 2011/0148785 A1 | 6/2011 | Oda et al. |
| 2011/0193776 A1 | 8/2011 | Oda et al. |
| 2012/0105362 A1 | 5/2012 | Kremin et al. |
| 2013/0106760 A1 | 5/2013 | Pedersen et al. |
| 2014/0043301 A1 | 2/2014 | Katsurahira |
| 2016/0139732 A1 | 5/2016 | Takeda et al. |
| 2016/0188016 A1 | 6/2016 | Munakata et al. |
| 2016/0320918 A1 | 11/2016 | Hara |

FOREIGN PATENT DOCUMENTS

| | | |
|---|---|---|
| WO | 2014/185523 A1 | 11/2014 |
| WO | 2015/002203 A1 | 1/2015 |
| WO | 2015/111159 A1 | 7/2015 |

OTHER PUBLICATIONS

International Search Report, dated Apr. 19, 2016, for International Application No. PCT/JP2016/058254, 2 pages.

International Search Report, dated May 31, 2016, for International Application No. PCT/JP2016/062325, 4 pages.

Japanese Office Action, dated Apr. 28, 2020, for Japanese Application No. 2017-535252, 9 pages. (with English machine translation).

FIG.16

PRIOR ART

| BIT STRING | "1" | "0" | "1" | "1" | "0" |

CHIP STRING  000100101111 110110100000010010111 000100101111 1101101000

SENSOR CONTROLLER, POSITION INDICATOR, AND POSITION DETECTING SYSTEM

BACKGROUND

Technical Field

The present disclosure relates to a sensor controller, a position indicator, and a position detecting system, and more particularly to a sensor controller for use in a position detector that detects the position of a position indicator on a touch surface, a position indicator capable of receiving signals sent by such a position detector, and a position detecting system that is provided with such a position detector and a position indicator.

Description of the Related Art

There is known a position detecting system, in which bidirectional communication is performed between a position indicator as a pen-type device and a position detector as a device having a touch surface such as a tablet or the like, or in which unidirectional communication is carried out from the position detector to the position indicator. Patent Document 1 discloses an example of the latter position detecting system.

Patent Document 2 discloses use of the direct sequence spread spectrum (DSSS) technique (hereinafter described as "direct spread technique") for communication between a position indicator and a position detector that make up a position detecting system.

PRIOR ART DOCUMENT

Patent Documents

Patent Document 1: PCT Patent Publication No. WO2015/111159
Patent Document 2: U.S. Pat. No. 7,084,860

BRIEF SUMMARY

Technical Problems

A communication method that is resistant to noise can be realized by using a direct spread technique for a method of communication between a position indicator and a position detector, as is the case with the disclosure described in Patent Document 2.

For example, a transmission-side device can be configured to encode a plurality of bits (a transmission bit string) that make up transmission data, bit by bit, using a known code string having autocorrelation characteristics (a code string where a peak correlation value appears only at a shift quantity 0 when a correlation value is calculated between the code string and a code string produced by cyclically shifting the code string or its inverted signal by an arbitrary shift quantity).

FIG. 16 depicts an example of a chip string generated by the transmission-side device according to an encoding process. In the example depicted in FIG. 16, "00010010111" having a length of 11 chips is used as the known code string having autocorrelation characteristics. A transmission bit string is given as "10110." As depicted in FIG. 16, if a bit to be sent has a value of "1," then the above code string directly becomes a transmission chip string. On the other hand, if a bit to be sent has a value of "0," then an inverted code string from the above code string becomes a transmission chip string.

When a reception-side device receives the transmission chip string sent by the transmission-side device, the reception-side device inputs the chip string, chip by chip, successively into a first-in, first-out shift register that has a capacity of 11 chips, and calculates on each input occasion a correlation value between a chip string of 11 chips temporarily accumulated in the shift register and the above known code string. Since the code string has autocorrelation characteristics, the calculated correlation value is a maximum value (+11 in this example) when the chip string stored in the shift register is precisely "00010010111," and a minimum value (−11 in this example) when the chip string stored in the shift register is precisely "11101101000" (an inverted code string from the known code string). On the other hand, the correlation values for other chip string values are values close to 0 (+1 or −1 in this example). The reception-side device is configured to extract transmission data sent by the transmission-side device from the received chip string, using such features of correlation values.

However, the communication method using the above direct spread technique suffers from a problem that it is difficult to obtain a high bit rate. Specifically, in the example depicted in FIG. 16, since 11 chips are required to express one bit (two values), only a value of $1/11$ of the chip rate can be achieved as a bit rate. As it is not easy to increase the chip rate, it is difficult to obtain a high bit rate as a result.

Consequently, one aspect of the present disclosure is directed to providing a sensor controller, a position indicator, and a position detecting system which are able to obtain a high bit rate compared with the background art.

Technical Solution

A sensor controller according to an aspect of the present disclosure is a sensor controller for use in a position detector for detecting a position of a position indicator on a touch surface. The sensor controller includes a controller that outputs a value of a symbol to be sent to the position indicator. The sensor controller includes a transmitter that generates a transmission signal including a first chip string produced by cyclically shifting a spread code having autocorrelation characteristics by a shift quantity based on the value of the symbol to be sent, and sends the generated transmission signal to the position indicator via the touch surface.

A position indicator according to the aspect of the present disclosure is a position indicator configured to be able to receive a signal sent by a sensor controller through a position detector having a touch surface. The position indicator includes a receiver that receives a signal, demodulates the value of a symbol included in the signal based on a cyclic shift quantity for a code string having autocorrelation characteristics which is included in the signal, and restores a sent command based on the demodulated value of the symbol. The position indicator includes a controller that controls the transmission of a signal to the sensor controller based on the command.

A position detecting system according to the aspect of the present disclosure is a position detecting system including a position indicator and a position detector for detecting a position of the position indicator on a touch surface. The position detector includes a controller for outputting a value of a symbol to be sent to the position indicator, and a transmitter for generating a transmission signal including a first chip string produced by cyclically shifting a code string having autocorrelation characteristics by a shift quantity based on at least a portion of the value of the symbol to be sent, and sending the generated transmission signal to the position indicator via the touch surface. The position indicator includes a receiver for successively inputting a series of chips generated by receiving the transmission signal to a first-in, first-out shift register, and each time a chip is input, calculating correlation values between the chip string temporarily accumulated in the shift register and a plurality of code strings produced by cyclically shifting a predetermined code string having autocorrelation characteristics by an arbitrary shift quantity, thereby detecting a bit string included in the series of chips.

Advantageous Effects

According to the present disclosure, since the cyclic shifting of a code string is used in generating a chip string, it is possible to express 2 bits or more with one code string. Accordingly, it is possible to obtain a high bit rate at the same chip rate, compared with the background art where only 1 bit can be expressed by one code string.

BRIEF DESCRIPTION OF THE DRAWINGS

FIG. 16 is a diagram depicting an example of a transmission code string generated by a position detector according to the background art of the present disclosure.

DETAILED DESCRIPTION

An embodiment of the present disclosure will be described in detail below with reference to the accompanying drawings.

Figure 1:
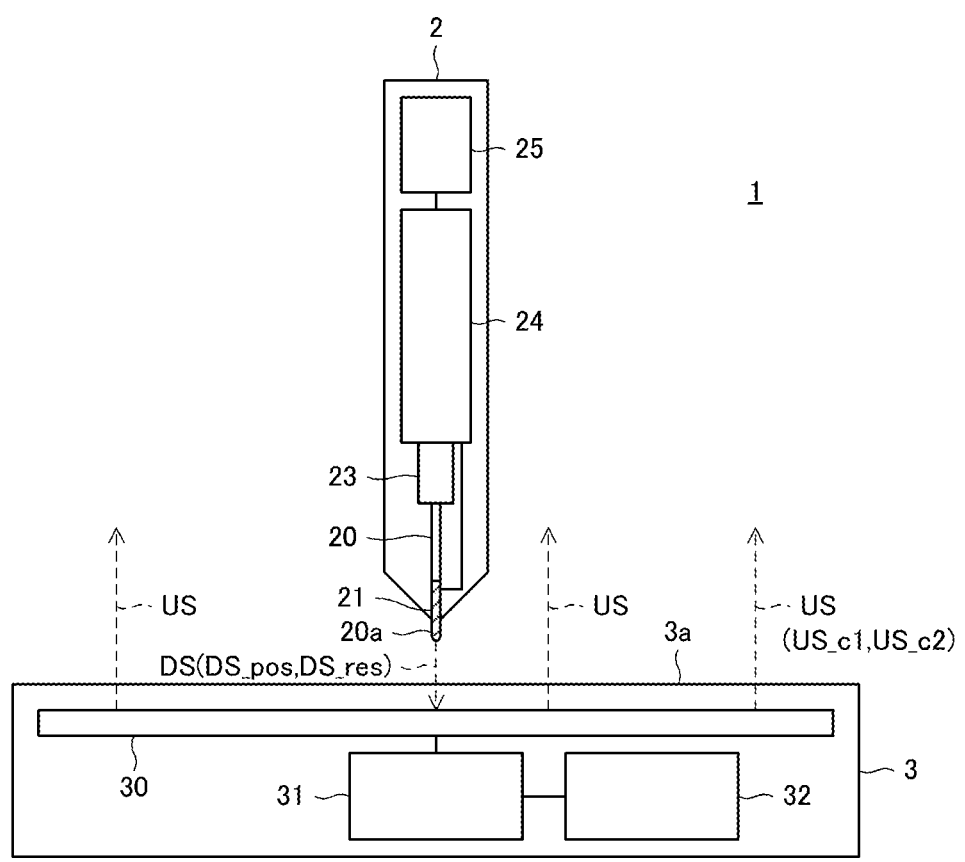
FIG. 1 is a diagram depicting an arrangement of a position detecting system 1 according to an embodiment of the present disclosure.

FIG. 1 is a diagram depicting an arrangement of a position detecting system 1 according to an embodiment of the present disclosure. The position detecting system 1 is provided with a stylus 2 and a position detector 3.

The stylus 2 is a position indicator of the active ES (electrostatic) type configured to be able to receive signals that are successively sent by the position detector 3. As depicted in FIG. 1, the stylus 2 has a core 20, an electrode 21, a pen pressure detection sensor 23, a circuit unit 24, and a power supply 25. A cylindrical AAAA cell, for example, is used as the power supply 25. In the present embodiment, an example in which the present disclosure is applied to the stylus 2 of the active ES type will be described. However, the present disclosure is also suitably applicable to a stylus of another type such as the electromagnetic induction type, for example.

The core 20 is a rod-shaped member disposed such that its longitudinal direction is aligned with the pen axis direction of the stylus 2. The core 20 has a distal end 20a whose surface is coated with an electrically conductive material, providing the electrode 21. The core 20 has a proximal end held against the pen pressure detection sensor 23. The pen pressure detection sensor 23 is used to detect a pressure (pen pressure) applied to the distal end 20a of the core 20.

The circuit unit 24 has a function to receive uplink signals US (a first control signal US_c1 and a second control signal US_c2) sent by the position detector 3 through the electrode 21, and a function to send downlink signals DS (a position signal DS_pos and a data signal DS_res) through the electrode 21 to the position detector 3. These signals will be described in detail later.

The position detector 3 has a sensor 30 that provides a touch surface 3a, a sensor controller 31, and a host processor 32 that controls various parts of the position detector 3 which include the sensor 30 and the sensor controller 31.

The sensor controller 31 has a function to receive the downlink signals DS (the position signal DS_pos and the data signal DS_res) sent by the stylus 2 through the sensor 30, and a function to send the uplink signals US (the first control signal US_c1 and the second control signal US_c2) through the sensor 30 to the stylus 2.

Figure 2:
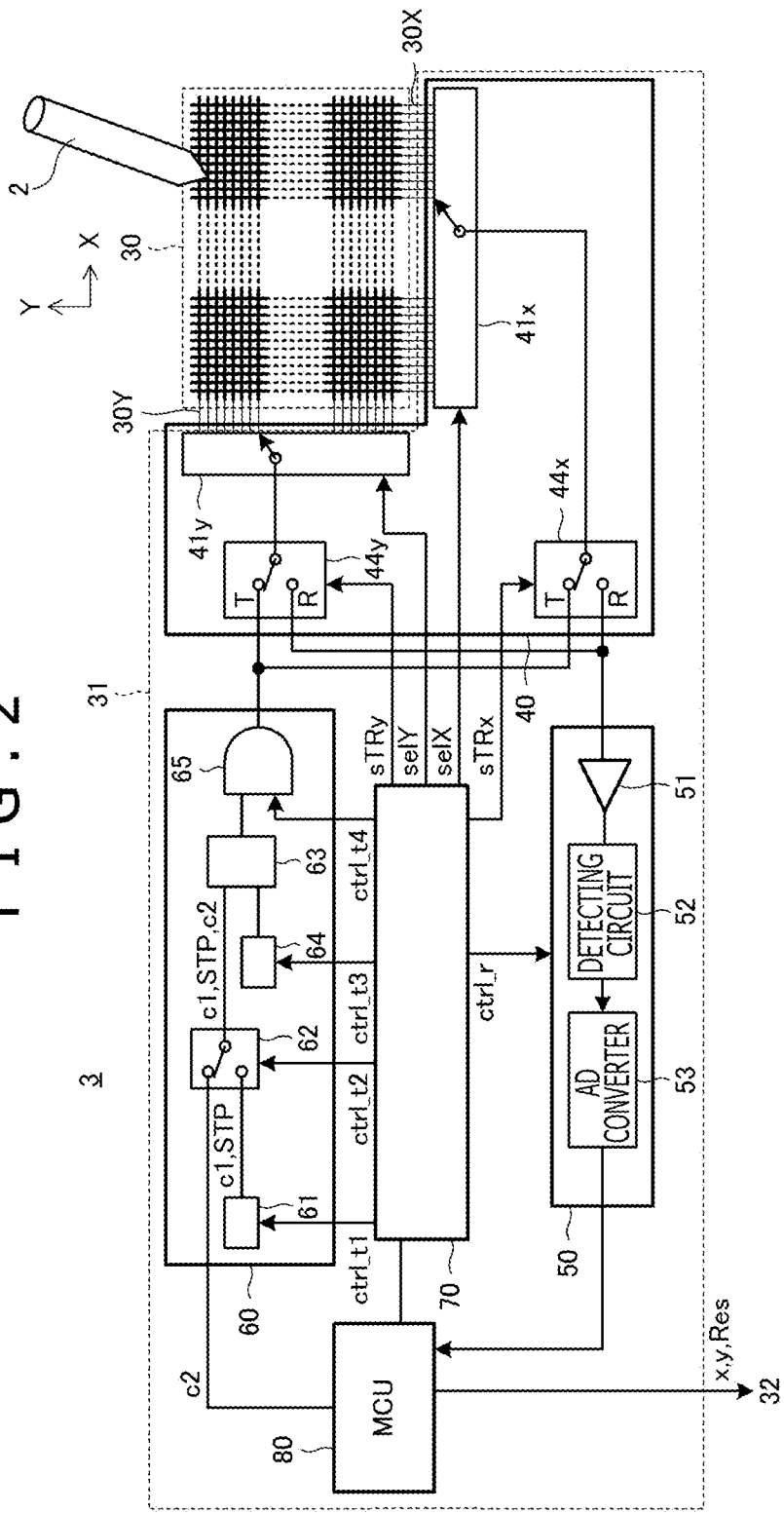
FIG. 2 is a diagram depicting an arrangement of a position detector 3 depicted in FIG. 1.

FIG. 2 is a diagram depicting an arrangement of the position detector 3. As depicted in FIG. 2, the sensor 30 includes a matrix of line-shaped electrodes 30X and line-shaped electrodes 30Y, and is capacitively coupled to the stylus 2 through the line-shaped electrodes 30X, 30Y. The sensor controller 31 has a transmitter 60, a selecting section 40, a receiver 50, a logic unit 70, and an MCU 80 (controller).

The transmitter 60 is a circuit for sending the uplink signals US (the first control signal US_c1 and the second control signal US_c2) depicted in FIG. 1. Specifically, the transmitter 60 includes a first control signal supply section 61, a switch 62, a spread processor 63, a code string hold section 64, and a transmission guard section 65. Of these components, the first control signal supply section 61 will be described as being included in the transmitter 60 according to the present embodiment. However, the first control signal supply section 61 may be included in the MCU 80.

The first control signal supply section 61 holds a detection pattern c1, and has a function to repeatedly output a signal (or a bit string) corresponding to the detection pattern c1 successively during a successive transmission period TCP (e.g., 3 msec.) depicted in FIG. 5 to be described later, as instructed by a control signal ctrl_t1 supplied from the logic unit 70. The first control signal supply section 61 also has a function to output a predetermined delimiter pattern STP successively at least twice immediately after the end of the successive transmission period TCP or at the time of starting to send the second control signal US_c2. The first control signal US_c1 is made up of the detection pattern c1 and the delimiter pattern STP thus output from the first control signal supply section 61.

The detection pattern c1 is a pattern of the values of symbols used for the stylus 2 to detect the existence of the sensor controller 31, and is known to the stylus 2 in advance (before the stylus 2 detects the sensor controller 31). A symbol is a unit of information used for modulation in a transmission process (a unit of information represented by a transmission signal), and a unit of information obtained by demodulating one symbol as a reception signal in a reception process. The values of symbols may include a value that is converted into a bit string by the stylus 2 having received the symbol (hereinafter described as "bit string associated value") and a value that is not converted into a bit string (hereinafter described as "bit string unassociated value"). As depicted in Table 1 to be described later, a symbol corresponding to the former value may take one of values, wherein a total number of such values is indicated by a power of 2, and is associated with a bit string, such as "0001." The bit length of each symbol represented by a bit string is determined by the specifications of the spread processor 63. On the other hand, a symbol corresponding to the latter value takes one or more (e.g., two) values not associated with a bit string, such as "P" and "M" as depicted in Table 1 to be described later. According to an example depicted in Table 1 to be described later, "P" and "M" are associated respectively with a predetermined spread code string and an inverted code string.

The detection pattern c1 can be represented by a pattern of bit string unassociated values, and may include a repetition of two bit string unassociated values "P" and "M," such as "PMPMPM . . . ," for example.

The delimiter pattern STP is a pattern of symbols for notifying the stylus 2 of the end of the successive transmission period described above, and includes a pattern of symbols that does not appear in the repetition of the detection pattern c1. For example, if the detection pattern c1 includes a repetition of two bit string unassociated values "P" and "M," such as "PMPMPM . . . ," then the delimiter pattern STP may include a pattern "PP" made up of two consecutive bit train unassociated values "P." The delimiter pattern STP and the detection pattern c1 may be switched around such that the delimiter pattern STP includes a pattern "PM" and the detection pattern c1 includes a pattern "PP."

The switch 62 has a function to select either the first control signal supply section 61 or the MCU 80 based on a control signal ctrl_t2 supplied from the logic unit 70, and supply an output signal from the selected one to the spread processor 63. If the switch 62 selects the first control signal supply section 61, then the spread processor 63 is supplied with the detection pattern c1 or the delimiter pattern STP. If the switch 62 selects the MCU 80, then the spread processor 63 is supplied with control information c2.

Figure 10:
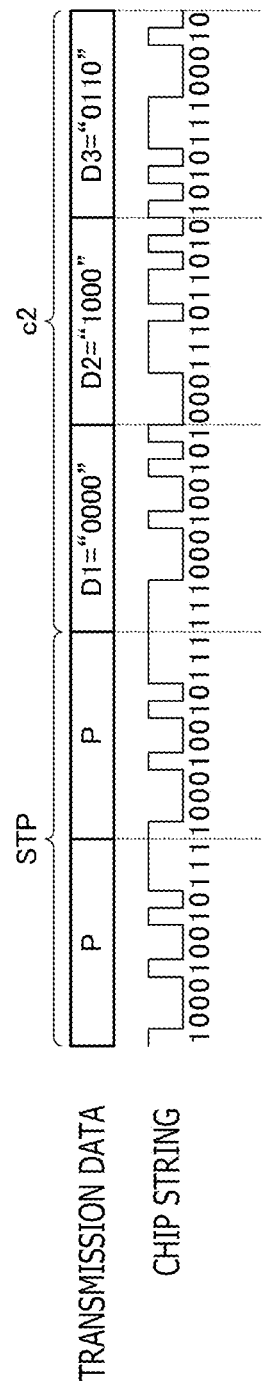
FIG. 10 is a diagram depicting an example of a second control signal US_c2.

The control information c2 includes information including a command that represents the content of an instruction for the stylus 2, and is generated by the MCU 80 and sent on the second control signal US_c2 as depicted in FIG. 10. The control information c2 includes values (for example, 0 through 15) of symbols associated with a variable-length bit string, and is different from the detection pattern c1 in that its values are not shared with the stylus 2 in advance. The control information c2 is different from the detection pattern c1 that includes the values "P" and "M" in that it is indicated by value "D" that can take any one of a number of values (e.g., 8 values, 16 values) that can be indicated by a power of 2 having a predetermined bit length described above. As depicted in FIG. 10, the second control signal US_c2 includes a delimiter pattern STP "PP" as a preamble followed by a transmission signal (chip string) corresponding to three items of control information c2 which are indicated by D1 through D3.

The code string hold section 64 has a function to generate and hold a spread code PN (second code string) which is 11 chips long that has autocorrelation characteristics based on a control signal ctrl_t3 supplied from the logic unit 70. The spread code PN held by the code string hold section 64 is supplied to the spread processor 63. Specific details of the spread code PN will be described later.

The spread processor 63 has a function (chip string acquiring function) to obtain a code string which is 12 chips long (a chip string CN2 depicted in Table 1, FIG. 6 to be described later, a second chip string) by performing primary modulation (cyclic shifting or inversion to be described later) on the spread code PN held by the code string hold section 64 based on the values of symbols (information represented by a transmission signal according to the processing of the spread processor 63) supplied via the switch 62. The chip string acquiring function (primary modulation process) will be described briefly below though it will be described in greater detail later with reference to FIGS. 5 through 9A, 9B.

Each of the detection pattern c1, the delimiter pattern STP, and the control information c2 according to the present embodiment includes a combination of bit string associated values 0 through 15 (associated bit strings "0000" through "1111") and bit string unassociated values "P" and "M." The spread code PN supplied from the spread code hold section 64 is "00010010111."

According to the primary modulation performed by the spread processor 63, the values (0 through 15, P, and M) of symbols are converted into respective corresponding chip strings CN2. Table 1 depicts specific examples of the associated relationship between the values of symbols and generated chip strings CN2 obtained by the chip string acquiring function.

TABLE 1

| Values of symbols | Associated bit strings | Polarity | Shift quantity | Transmission signal (chip string CN2) |
|---|---|---|---|---|
| P | Unassociated | Non-inverted | 0 (Reference) | 1_00010010111 |
| 0 | 0000 | Non-inverted | +2 | 1_11000100101 |
| 1 | 0001 | Non-inverted | +3 | 1_11100010010 |
| 3 | 0011 | Non-inverted | +4 | 1_01110001001 |
| 2 | 0010 | Non-inverted | +5 | 1_10111000100 |
| 6 | 0110 | Non-inverted | +6 | 1_01011100010 |
| 7 | 0111 | Non-inverted | +7 | 1_00101110001 |
| 5 | 0101 | Non-inverted | +8 | 1_10010111000 |
| 4 | 0100 | Non-inverted | +9 (−2) | 1_01001011100 |
| M | Unassociated | Inverted | 0 (Reference) | 0_11101101000 |
| 8 | 1000 | Inverted | +2 | 0_00111011010 |
| 9 | 1001 | Inverted | +3 | 0_00011101101 |
| 11 | 1011 | Inverted | +4 | 0_10001110110 |
| 10 | 1010 | Inverted | +5 | 0_01000111011 |
| 14 | 1110 | Inverted | +6 | 0_10100011101 |
| 15 | 1111 | Inverted | +7 | 0_11010001110 |
| 13 | 1101 | Inverted | +8 | 0_01101000111 |
| 12 | 1100 | Inverted | +9 (−2) | 0_10110100011 |

As depicted in Table 1, one symbol represents multiple values, and the value of a symbol is associated with any one of the chip strings CN2 in Table 1, which are obtained by cyclically shifting the spread code PN by a shift quantity based on the value of the symbol and non-inverting or inverting, respectively, the cyclically shifted spread code PN. The value of a symbol takes one of the values ("0 through 15"), in a total number (e.g., 16) indicated by a power of 2 represented by a bit string having a predetermined bit length, or takes either one of the values ("P" and "M") which are not associated with a bit string and which are different from any of the values in the total number indicated by a power of 2 as described above. The former value ("0 through 15") is used to send the control information c2, and the latter value ("P" and "M") is used to send the delimiter pattern STP such as a preamble or the like.

Each of the rows of the table will be described in detail below. The value "P" of a symbol is a bit string unassociated value, and is converted into a code string including the spread code PN "00010010111" having autocorrelation characteristics with a fixed chip "1" added to the beginning thereof. The bit string unassociated value "M" is converted into a code string including an inverted code "11101101000" produced by inverting the polarity of the spread code PN "00010010111," with a fixed chip "0" added to the beginning thereof.

Each of the bit string associated values 0 through 7 is converted into a code string including a code produced by cyclically shifting the spread code PN by a shift quantity depicted in Table 1, with "1" assigned to the beginning thereof. For example, the value "4" of a symbol is converted into a code string including a code produced by cyclically shifting the spread code PN to the right by 9 (to the left by 2), with "1" assigned to the beginning thereof. Each of the bit string associated values 8 through 15 is converted into a code string including a code produced by cyclically shifting an inverted code "11101101000" produced by inverting the polarity of the spread code PN, by a predetermined shift quantity based on the value of the symbol, with "0" assigned to the beginning thereof. For example, the value "12" of a symbol is converted into a code string including a code produced by inverting the spread code PN and cyclically shifting the inverted spread code to the right by 9 (to the left by 2), with "0" assigned to the beginning thereof.

The difference between the closest shift quantities among the shift quantities of the bit string associated values 0 through 7 for use in a command is 1. On the other hand, the difference between the shift quantity of the value "P" of a symbol for use in the delimiter pattern STP such as a preamble or the like (i.e., 0), and the closest shift quantity of the bit string associated value "2" (2 to the right) or the closest shift quantity of the bit string associated value "4" (2 to the left) among the bit string associated values 0 through 7, is 2, which is larger than the smallest difference among the differences between the shift quantities of the bit string associated values 0 through 7. Since the difference between the shift quantity ("0") of the values "P" and "M" of symbols for use in the delimiter pattern such as a preamble or the like and the shift quantity (+2, −2) of the values ("0," "4" and "8," "12") for use in a command is thus larger than the smallest difference between the shift quantity for a certain value used in a command and the shift quantity for another value used in a command, the probability that the delimiter pattern such as a preamble or the like will be determined in error to be any of predetermined values corresponding to a command is reduced.

A shift quantity is determined such that the smaller the Hamming distance is between a bit string, with which the value of a certain symbol is associated, and a bit string, with which the value of another symbol is associated, the smaller the difference is between the shift quantity for the value of the certain symbol and the shift quantity for the value of the other symbol. The reason why a shift quantity is determined based on the Hamming distances between the bit strings as depicted in Table 1, rather than simply increasing a shift quantity as the value of a symbol increases, will be described later.

The transmitter 60 (the spread processor 63 that has acquired the chip string CN2) may not use chip strings CN2 acquired as depicted in Table 1 as a transmission signal, but may perform a process (secondary modulation process) for generating a transmission signal by modulating a carrier signal with chip strings CN2. Although the secondary modulation process is not necessarily required, the secondary modulation process may include a process for Manchester-encoding chip strings CN2.

Figure 3A:
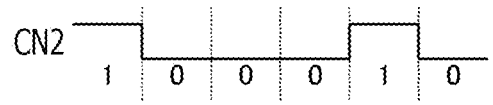
FIGS. 3A through 3C are diagrams depicting examples of signals generated by a spread processor 63.
Figure 3B:
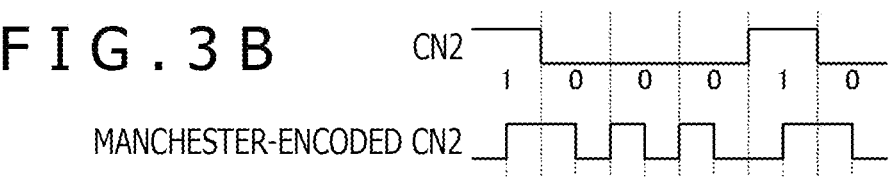
Figure 3C:
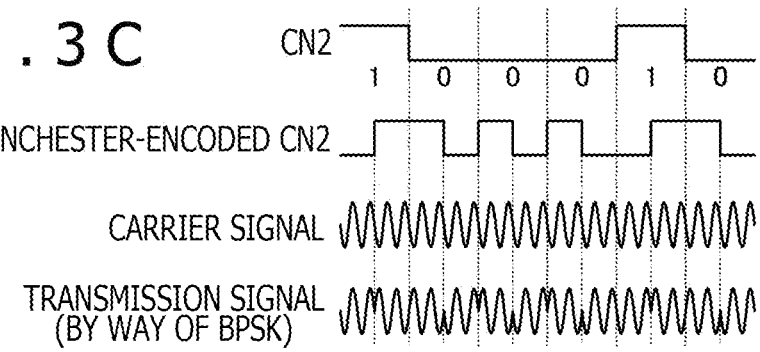

FIGS. 3A through 3C are diagrams depicting examples of signals generated by the spread processor 63. These examples will be described below.

FIG. 3A depicts an example in which the spread processor 63 does not perform the secondary modulation process. In this example, a chip string CN2 generated by primary modulation directly becomes a transmission signal generated by the spread processor 63.

FIG. 3B depicts an example in which the spread processor 63 performs only Manchester encoding as the secondary modulation process. In this example, the spread processor 63 assigns rising (positive-going) edges to chips "1" and falling (negative-going) edges to chips "0" of a plurality of chips included in a chip string CN2, thereby acquiring a Manchester-encoded chip string CN2. Alternatively, the spread processor 63 may Manchester-encode a chip string CN2 by assigning falling edges to chips "1" and rising edges to chips "0." In the example depicted in FIG. 3B, the Manchester-encoded chip string CN2 becomes a transmission signal generated by the spread processor 63.

FIG. 3C depicts an example in which the spread processor 63 performs Manchester encoding and digital modulation as the secondary modulation process. In this example, the spread processor 63 modulates a predetermined carrier signal with the Manchester-encoded chip string CN2, generating a transmission signal depicted in FIG. 3C. Although a transmission signal generated according to BPSK (Binary Phase Shift Keying) is illustrated in FIG. 3C, another digital modulating technique may be used. In FIG. 3C, a sine-wave signal is used as the carrier signal. However, another type of carrier signal such as a rectangular-wave signal may be used.

With Manchester encoding included in the secondary modulation process carried out by the spread processor 63, the same value does not continue over a period more than a period corresponding to one chip, as can be understood from FIG. 3B. By thus performing secondary modulation on a transmission signal whose spectrum is spread by the spread code PN, the transmission signal can be sent using a desired frequency band in order to avoid low-frequency components, for example.

Referring back to FIG. 2, the transmission signal (the first control signal US_c1 and the second control signal US_c2) generated by the spread processor 63 is supplied to the transmission guard section 65. The transmission guard section 65 has a function to insert a guard period, which is a period in which neither transmission nor reception is carried out in order to switch between a transmitting operation and a receiving operation, between a transmission period for the first control signal US_c1 and the second control signal US_c2 and a reception period RDS, according to a control signal ctrl_t4 supplied from the logic unit 70.

The selecting section 40 is a switch for switching between the transmission period in which the sensor 30 sends signals and the reception period in which the sensor 30 receives signals, under the control of the logic unit 70. Specifically, the selecting section 40 includes switches 44x and 44y and conductor selecting circuits 41x and 41y. Based on a control signal sTRx supplied from the logic unit 70, the switch 44x operates to connect the output terminal of the transmitter 60 to the input terminal of the conductor selecting circuit 41x during the transmission period and to connect the output terminal of the conductor selecting circuit 41x to the input terminal of the receiver 50 during the reception period. Based on a control signal sTRy supplied from the logic unit 70, the switch 44y operates to connect the output terminal of the transmitter 60 to the input terminal of the conductor selecting circuit 41y during the transmission period and to connect the output terminal of the conductor selecting circuit 41y to the input terminal of the receiver 50 during the reception period. Based on a control signal selX supplied from the logic unit 70, the conductor selecting circuit 41x operates to select one of the line-shaped electrodes 30X and to connect the selected line-shaped electrode 30X to the switch 44x. Based on a control signal selY supplied from the logic unit 70, the conductor selecting circuit 41y operates to select one of the line-shaped electrodes 30Y and to connect the selected line-shaped electrode 30Y to the switch 44y.

The receiver 50 is a circuit for detecting or receiving the position signal DS_pos and the data signal DS_res sent by the stylus 2 based on a control signal ctrl_r from the logic unit 70. Specifically, the receiver 50 includes an amplifying circuit 51, a detecting circuit 52, and an analog-to-digital (AD) converter 53.

The amplifying circuit 51 amplifies and outputs the position signal DS_pos and the data signal DS_res supplied from the selecting section 40. The detecting circuit 52 is a circuit for generating a voltage commensurate with the level of an output signal from the amplifying circuit 51. The AD converter 53 is a circuit for generating a digital signal by sampling the voltage output from the detecting circuit 52 at predetermined time intervals. The digital data output by the AD converter 53 are supplied to the MCU 80.

The logic unit 70 and the MCU 80 serve as a controller for controlling the transmitter 60 and the receiver 50, etc. Specifically, the MCU 80 includes a microprocessor that has a ROM and a RAM therein and operates according to predetermined programs. The logic unit 70 is configured to output control signals described above under the control of the MCU 80. The MCU 80 is configured to derive coordinate data x, y indicating the position of the stylus 2 based on digital data supplied from the AD converter 53 and to output the derived coordinate data x, y to the host processor 32.

Figure 4:
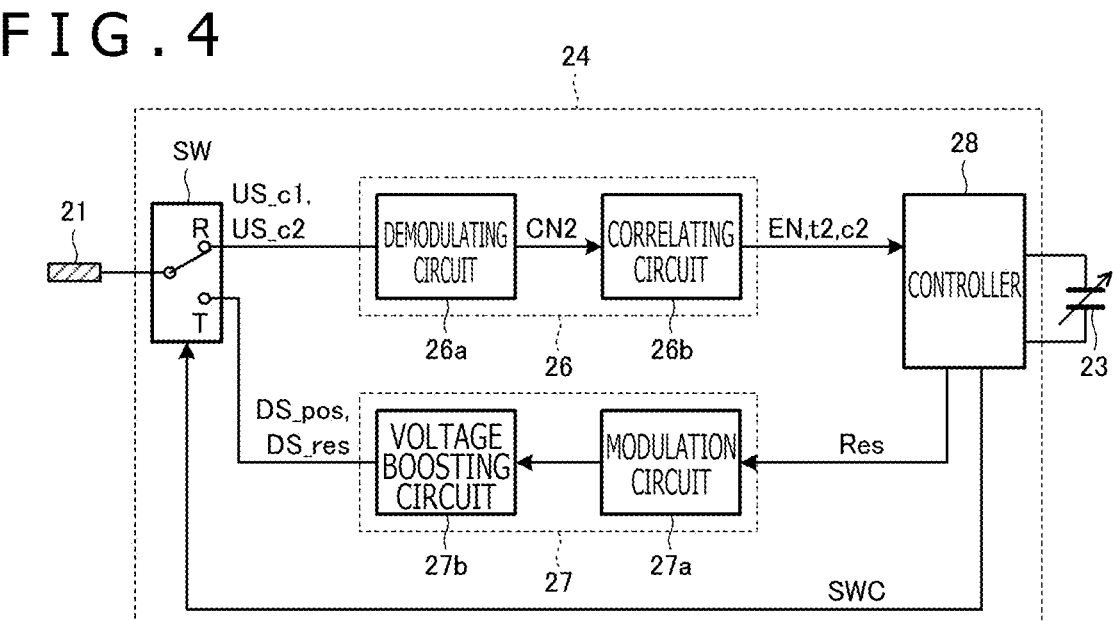
FIG. 4 is a block diagram depicting functional blocks of a circuit unit 24 depicted in FIG. 1.

FIG. 4 is a block diagram depicting functional blocks of the stylus 2. As depicted in FIG. 4, the stylus 2 includes a switching section SW, a receiver 26, a transmitter 27, and a controller 28.

The switching section SW is a switch for switching between reception R and transmission T based on a control signal SWC from the controller 28. The switching section SW connects the electrode 21 to the receiver 26 during the reception R and connects the electrode 21 to the transmitter 27 during the transmission T. The switching section SW is set to the reception R in an initial state, i.e., during a pre-detection period BD (see FIG. 5) before the stylus 2 detects the first control signal US_c1.

The receiver 26 is a circuit for receiving a signal (a signal arriving at the electrode 21) supplied from the switching section SW and obtaining the values of symbols from the transmission signal depicted in Table 1. The receiver 26 includes a demodulating circuit 26a and a correlating circuit 26b. In order to reduce electric power consumption, the receiver 26 is disabled in its operation except for shortened reception periods SRP, during the pre-detection period BD before the stylus 2 detects the sensor controller 31.

Operation of the receiver 26 will be described also with reference to FIG. 5. The receiver 26 performs a receiving operation in predetermined period WPa (e.g., 2.5 msec.) to receive a first control signal US_c1 in the shortened reception periods SRP (periods shorter than the periods WPa, e.g., 60 μsec.), and determines whether a detection pattern c1 that is a pattern of the values of symbols, such as "PM" or "MP," not associated with a bit string having a predetermined length is included in the first control signal US_c1. The stylus 2 thus tries to detect the sensor controller 31. After having detected the sensor controller 31, the receiver 26 continues the receiving operation to detect a delimiter pattern STP. The receiver 26 receives a signal, which is detected after the delimiter pattern STP, as a second control signal US_c2, and performs a process of extracting control information c2 made up of values D associated with a bit string having a predetermined length.

According to the present embodiment, as described above, two successive identical symbol values "PP" make up the delimiter pattern STP. The delimiter pattern STP is thus configured because the stylus 2 may receive a signal from the position detector 3 via its housing, not the electrode 21, as an antenna. In such a situation, since the circuit unit 24 of the stylus 2 is supplied with signals whose positive and negative signs are inverted, the stylus 2 is unable to receive control information c2 properly. Accordingly, for detecting the delimiter pattern STP, the stylus 2 monitors not only the symbol values "PP," but also symbol values "MM" made up of a chip string which is produced by inverting the chip string representing the symbol values "PP." If the stylus 2 detects the symbol values "PP," then the stylus 2 tries to receive control information c2 by detecting a subsequent chip string as usual. On the other hand, if the stylus 2 detects the symbol values "MM," the stylus 2 tries to receive control information c2 by inverting a subsequent chip string in its entirety after having detected the same. In this manner, for determining whether the symbol values are inverted or non-inverted, the stylus 2 uses the first chip string, inverted or non-inverted, as a reference, thereby allowing itself to acquire data of the control information c2 without making errors about deciding on polarity inversion or non-inversion, even if a signal comes from the position detector 3 via the housing of the stylus 2, not the electrode 21, and the polarity of a signal obtained through the electrode 21 is inverted.

The demodulating circuit 26a is a receiving circuit for generating a series of chips by receiving a signal sent by the position detector 3. Specifically, if the position detector 3 performs Manchester encoding and digital modulation as the secondary modulation process, then the demodulating circuit 26a performs a process of successively acquiring a series of chips by demodulating a signal induced on the electrode 21 according to the modulating technique that the spread processor 63 of the position detector 63 has used to modulate the carrier signal, and successively decoding the series of chips according to an inverted process of Manchester encoding. The demodulating circuit 26a is configured to supply the decoded series of chips, chip by chip, to the correlating circuit 26b. If the spread processor 36 performs neither Manchester encoding nor digital modulation, then the demodulating circuit 26a directly supplies a series of chips that are successively received, chip by chip, to the correlating circuit 26b.

The correlating circuit 26b has a function to detect a detection pattern c1, a delimiter pattern STP, or control information c2 included in the series of chips supplied from the demodulating circuit 26a by performing a correlating process between the series of chips and a plurality of known code strings. This detecting function will be described in detail later with reference to FIG. 11. If the correlating circuit 26b detects a detection pattern c1, then the correlating circuit 26b issues an activation signal EN to the controller 28. If the correlating circuit 26b detects a delimiter pattern STP, then the correlating circuit 26b outputs detected time t2 to the controller 28. If the correlating circuit 26b detects control information c2, then the correlating circuit 26b outputs the detected control information c2 to the controller 28.

The controller 28 includes a microprocessor (MCU), and is activated when it is supplied with the activation signal EN from the receiver 26 (i.e., when the receiver 26 detects the detection pattern c1), and performs various processes. Specifically, based on the detected signal t2 supplied from the receiver 26, the controller 28 generates a transmission and reception schedule for various signals (the control information c2, the position signal DS_pos, and the data signal DS_res). The controller 28 performs a process of generating control signals SWC based on the generated transmission and reception schedule and supplying the generated control signals SWC to the switching section SW, and a process of controlling a method of sending the data signal DS_res based on control information c2 supplied from the receiver 26.

The process of controlling the method of sending the data signal DS_res will be described in detail below. If the contents of information to be sent (pen ID, a pen pressure value, and the state in which a side switch is pressed, etc.) are specified by the control information c2, then the controller 28 controls the contents of information to be sent to the position detector 3 according to the specified contents. Specifically, the controller 28 generates transmission data Res including the information to be sent and supplies the generated transmission data Res to the transmitter 27. If the transmission timing to send the data signal DS_res (e.g., a time slot used to send the data signal DS_res) is specified by the control information c2, then the controller 28 controls the timing to supply the transmission data Res to the transmitter 27 so that the data signal DS_res will be sent at the transmission timing. Furthermore, if the frequency used to send the data signal DS_res is specified by the control information c2, then the controller 28 controls a modulation circuit 27a to be described later in order to generate a carrier signal having the specified frequency.

If the receiver 26 has not detected the detection pattern c1, i.e., if the receiver 26 has completed the above processes in response to the previous activation signal EN supplied thereto, but has not yet been supplied with a next activation signal EN, then the controller 28 may disable the above processes (i.e., the controller 28 does not perform its processes). In this fashion, the electric power consumption of the controller 28 can be reduced.

The transmitter 27 is a circuit for sending the position signal DS_pos and the data signal DS_res, and includes a modulation circuit 27a and a voltage boosting circuit 27b.

The modulation circuit 27a is a circuit for generating a carrier signal (e.g., a rectangular-wave signal) having a predetermined frequency or a frequency controlled by the controller 28, and outputting the carrier signal as it is or after modulating it under the control of the controller 28. When the position signal DS_pos is to be sent, the modulation circuit 27a does not modulate the carrier signal and outputs the carrier signal as it is. When the data signal DS_res is to be sent, the modulation circuit 27a modulates the carrier signal with transmission data Res supplied from the controller 28, and outputs the modulated signal obtained as a result. A digital modulating technique such as PSK (Phase Shift Keying) may be described as a specific modulating technique for modulating the carrier signal.

The voltage boosting circuit 27b is a circuit for boosting the voltage of output signals from the modulation circuit 27a to a certain amplitude thereby to generate the position signal DS_pos and the data signal DS_res. The position signal DS_pos and the data signal DS_res that have been generated by the voltage boosting circuit 27b are supplied via the switching section SW to the electrode 21, from which they are transmitted into space. The voltage boosting circuit 27b and the modulation circuit 27a may be realized as a single processor.

Figure 5:
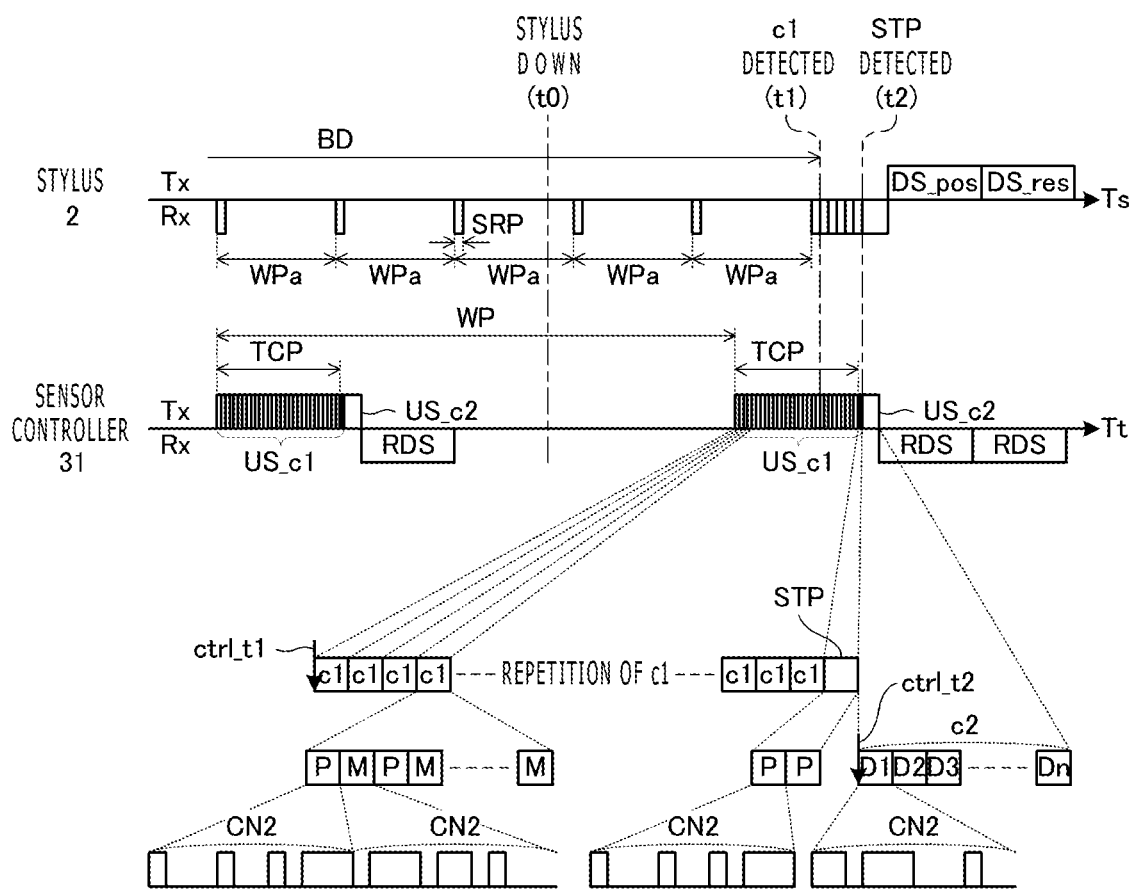
FIG. 5 is a timing chart illustrative of a chronological sequence of operation of a stylus 2 and a sensor controller 31 depicted in FIG. 1.

FIG. 5 is a timing chart illustrative of a chronological sequence of operation of the stylus 2 and the sensor controller 31. In FIG. 5, a time axis indicated at an upper section Ts represents transmission Tx and reception Rx of the stylus 2, and a time axis indicated at a lower section Tt represents transmission Tx and reception Rx of the sensor controller 31.

A period up to time t0 is a period in which the stylus 2 is outside a detecting range of the sensor controller 31. In order to reduce electric power consumption, the stylus 2 operates the receiver 26 intermittently a plurality of times in periods WPa shorter than the successive transmission period TCP. Specifically, in each of the periods WPa, the stylus 2 operates the receiver 26 only during the shortened reception period SRP, and disables the receiver 26 for the rest of the time in WPa. The time length of the reception period SRP is set to a value that is necessary and sufficient to receive the detection pattern c1 once.

The sensor controller 31 is configured to repeat the transmission of the first control signal US_c1 and the second control signal US_c2 in a period WP.

Specifically, as the period WP starts, the sensor controller 31 repeats the transmission of a chip string representing the detection pattern c1 over the successive transmission period TCP that is longer than the period WPa.

As described above, the detection pattern c1 according to the present embodiment is "PMPMPMP....". The position detector 3 converts each of the values P and the values M that make up the detection pattern c1 into a chip string CN2 that is 12 chips long according to the chip string acquiring function of the spread processor 63 depicted in FIG. 2. Details will be described later.

The sensor controller 31 is configured to send a delimiter pattern STP indicating the end of the transmission of the detection pattern c1 (or the start of the second control signal US_c2) by sending a chip string that represents the same symbol value P successively twice immediately after the end of the successive transmission period TCP. Each value P is converted into a chip string CN2 which is 12 bits long according to the chip string acquiring function of the spread processor 63 depicted in FIG. 2. The transmission of the first control signal US_c1 is completed at this point.

Having completed the transmission of the first control signal US_c1, the sensor controller 31 then sends a chip string representing control information c2 (i.e., the second control signal US_c2). The control information c2, which is sent subsequently to the delimiter pattern STP, as described above, includes information including an arbitrary bit string representing a command. "D1," "D2," "D3,"..., and "Dn" depicted in FIG. 4 each represent a value D that is an arbitrary 4-bit bit string ("0000," "0001," or the like), and is converted into a chip string CN2 which is 12 chips long according to the chip string acquiring function of the spread processor 63 depicted in FIG. 2.

The sensor controller 31 that has completed the transmission of the second control signal US_c2 provides a reception period RDS for receiving a signal from the stylus 2. In case the stylus 2 has received the first control signal US_c1 sent as described above, the stylus 2 sends the position signal DS_pos in the reception period RDS. During the reception period RDS, the sensor controller 31 waits for the reception of the position signal DS_pos thus sent.

Upon movement of the stylus 2 into the detecting range of the sensor 30 at time t0 (stylus-down), the stylus 2 detects the detection pattern c1 sent by the sensor controller 31 at the timing of time t1 immediately after the reception period SRP positioned in the subsequently arriving successive transmission period TCP.

When the stylus 2 detects the detection pattern c1, the stylus 2 generates the activation signal EN described above and subsequently continues the receiving operation beyond the reception period SRP. If the sensor controller 31 sends the delimiter pattern STP while the stylus 2 is performing the receiving operation, the stylus 2 detects the delimiter pattern STP. In case the stylus 2 detects the delimiter pattern STP, it refers to time t2 at which it detects the delimiter element STP, and generates a transmission and reception schedule for the second control signal US_c2, the position signal DS_pos, and the data signal DS_res. Specifically, as depicted in FIG. 5, the stylus 2 waits for the reception of the second control signal US_c2 at the timing based on time t2, then sends the position signal DS_pos, and finally sends the data signal DS_res.

As described above, the sensor controller 31 provides the reception period RDS after having sent the second control signal US_c2 and waits for the reception of the position signal DS_pos. Having received the position signal DS_pos, the sensor controller 31 calculates the position (coordinate data x, y) of the stylus 2 based on how the position signal DS_pos is received by the line-shaped electrodes 30X, 30Y depicted in FIG. 2, outputs the calculated position to the host processor 32 depicted in FIG. 1, provides the reception period RDS again, and waits for the reception of the data signal DS_res. Having received the data signal DS_res, the sensor controller 31 extracts the transmission data Res from the received data signal DS_res and outputs the extracted transmission data Res to the host processor 32.

Even after having received the position signal DS_pos and the data signal DS_res from the stylus 2, the sensor controller 31 still repeats the transmission of the first control signal US_c1 and the second control signal US_c2 in the same manner as before. The stylus 2 also repeats the above operation. The sensor controller 31 receives the position signal DS_pos and the data signal DS_res from the stylus 2 each time the stylus 2 repeats the above operation, thereby calculating the position of the stylus 2 and acquiring the transmission data Res sent by the stylus 2.

The outline of the position detecting system 1 has been described above. The chip string acquiring function of the spread processor 63 depicted in FIG. 2 and the detecting function of the correlating circuit 26b depicted in FIG. 3 will be described successively in detail below. In particular, specific contents of the spread code PN in addition to an example of a specific configuration of the chip string acquiring function of the spread processor 63 that obtains a transmission signal from the values of symbols depicted in Table 1 will also be described in detail below.

Figure 6:
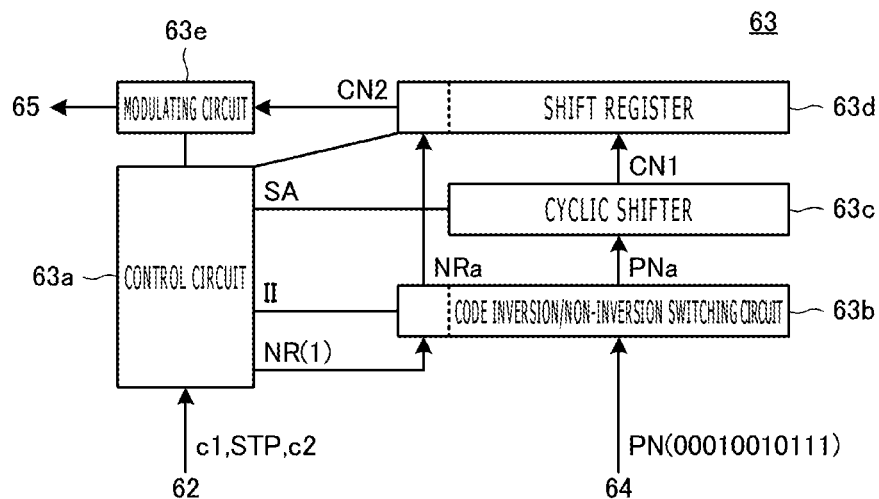
FIG. 6 is a block diagram depicting functional blocks of the spread processor 63 depicted in FIG. 2.

FIG. 6 is a block diagram depicting functional blocks of the spread processor 63 depicted in FIG. 2. As depicted in FIG. 6, the spread processor 63 has a control circuit 63a, a code inversion/non-inversion switching circuit 63b (code string generator), a cyclic shifter 63c (cyclically shifting unit), a shift register 63d (chip string generator), and a modulating circuit 63e.

The code inversion/non-inversion switching circuit 63b has a function to generate a code string PNa (first code string) which is 11 chips long and which has autocorrelation characteristics, based on the spread code PN (second code string) which is 11 chips long and which is stored in the code string hold section 64. Specifically, the code inversion/non-inversion switching circuit 63b selects either the spread code PN or the inverted code from the spread code PN according to inversion information II supplied from the control circuit 63a, and generates a code string PNa according to the selected code string.

The spread code PN will be described in detail below. As described above, the spread code PN is a code string having autocorrelation characteristics. When correlation values between the spread code PN and a code string produced by cyclically shifting the spread code PN or its inverted signal by an arbitrary shift quantity are calculated, a peak correlation value appears only at a shift quantity 0. The fact that the spread code PN has autocorrelation characteristics will be described below with reference to FIG. 9. It is assumed below that the spread code PN is "00010010111."

Figure 9A:
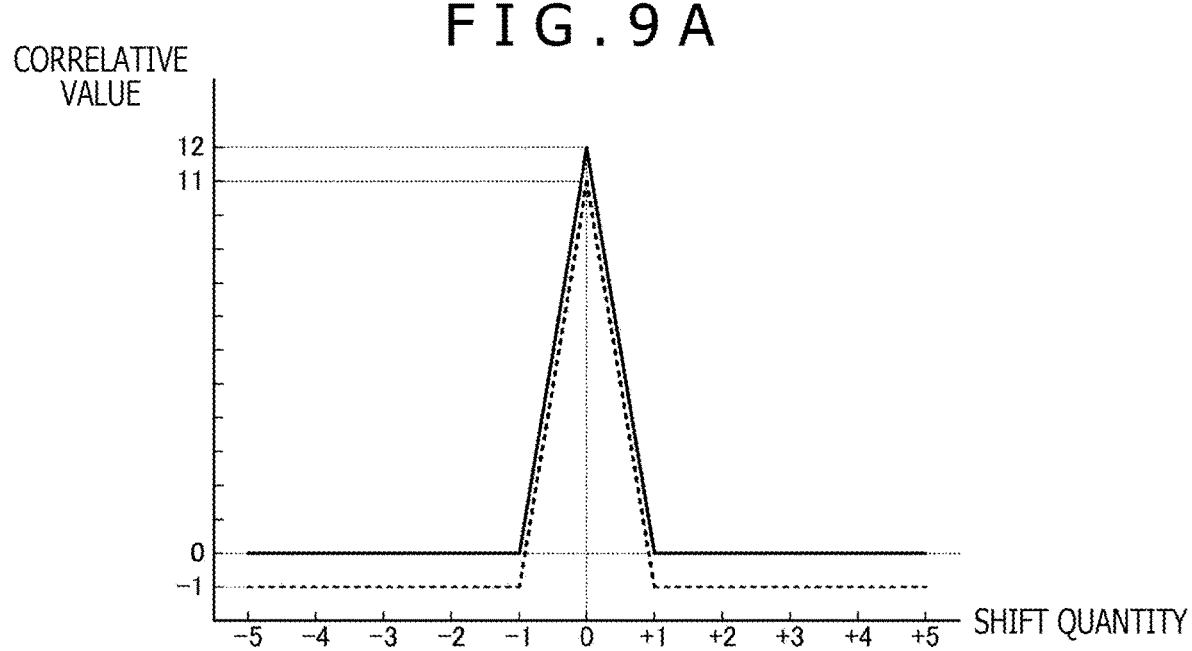
FIG. 9A is a diagram depicting a solid-line curve that represents correlation values between a code string C1-0 depicted in FIG. 8 and a code string produced by cyclically shifting a portion, except a fixed chip NRa, of the code string C1-0 by an arbitrary shift quantity, and a broken-line curve that represents correlation values between a spread code PN depicted in FIG. 6 and a code string produced by cyclically shifting the spread code PN by an arbitrary shift quantity.

FIG. 9A depicts a broken-line curve that represents correlation values between the spread code PN "00010010111"

and a code string produced by cyclically shifting the spread code PN by an arbitrary shift quantity. According to the broken-line curve, the correlation values at a shift quantity "+1" are correlation values between the spread code PN "00010010111" and a code string "10001001011" produced by cyclically shifting the chips of the spread code PN to the right by 1. Furthermore, the correlation values at a shift quantity "−2" are correlation values between the spread code PN "00010010111" and a code string "01001011100" produced by cyclically shifting the chips of the spread code PN to the left by 2. It should be noted that "0" is treated as "−1" in computing the correlation value.

Figure 9B:
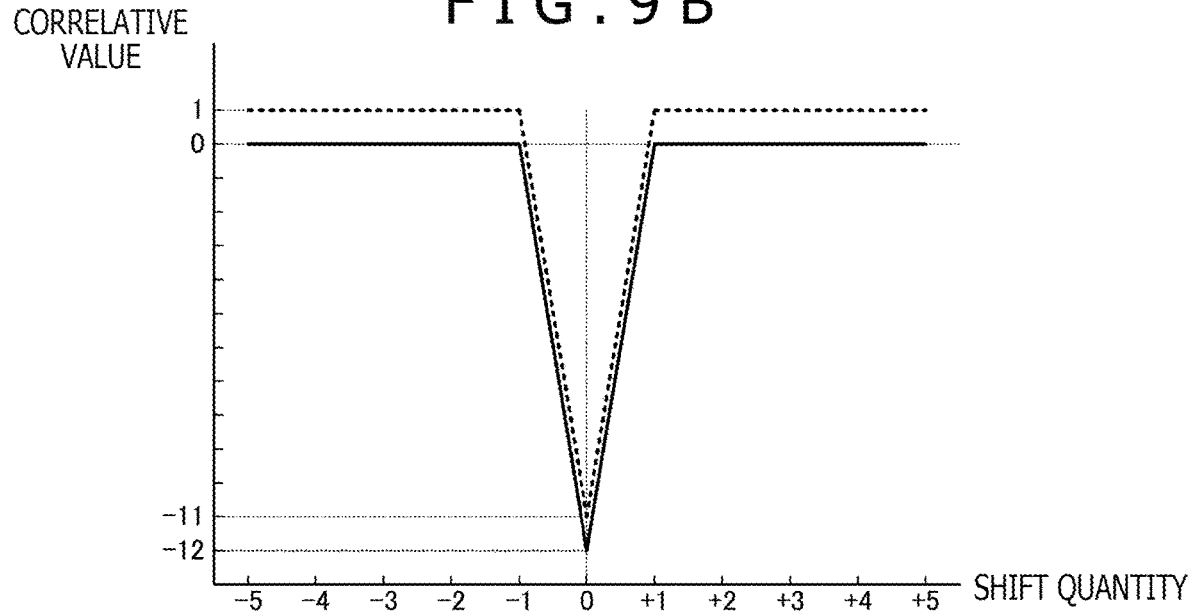
FIG. 9B is a diagram depicting a solid-line curve that represents correlation values between the code string C1-0 depicted in FIG. 8 and a code string produced by cyclically shifting a portion, except the fixed chip NRa, of an inverted code from the code string C1-0 by an arbitrary shift quantity, and a broken-line curve that represents correlation values between the spread code PN depicted in FIG. 6 and a code string produced by cyclically shifting an inverted code from the spread code PN by an arbitrary shift quantity.

FIG. 9B depicts a broken-line curve that represents correlation values between the spread code PN "00010010111" and a code string produced by cyclically shifting an inverted code "11101101000" by an arbitrary shift quantity. According to the broken-line curve, the correlation values at a shift quantity "+1" are correlation values between the spread code PN "00010010111" and a code string "01110110100" produced by cyclically shifting the chips of the inverted code to the right by 1. Furthermore, the correlation values at a shift quantity "−2" are correlation values between the spread code PN "00010010111" and a code string "10110100011" produced by cyclically shifting the chips of the inverted code to the left by 2.

In either one of FIGS. 9A and 9B, a correlation value peak represented by the broken-line curve appears only at a shift quantity "0." Therefore, when correlation values are calculated between the spread code PN and a code string produced by cyclically shifting the spread code PN or an inverted signal by an arbitrary shift quantity, since a correlation value peak appears only at a shift quantity "0," it can be said that the spread code PN has autocorrelation characteristics.

Referring back to FIG. 6, the code inversion/non-inversion switching circuit 63b has a function to be supplied with a fixed code NR from the control circuit 63a, and invert or not invert the fixed code NR according to the inversion information I1 supplied from the control circuit 63a, thereby generating a fixed chip NRa. The fixed code NR is a code that is 1 chip long, and is represented by "1" in the example depicted in FIG. 6. The fixed code NR is used in order to make the floor value (correlation values other than the peak) of the correlation values of the chip string CN2 output from the shift register 63d equal to "0." This point will be described separately in detail later.

The cyclic shifter 63c is a functional block for cyclically shifting the code string PNa generated by the code inversion/non-inversion switching circuit 63b by a shift quantity SA supplied from the control circuit 63a, thereby generating a chip string CN1 (first chip string). The shift register 63d is a functional block for receiving the chip string CN1 generated by the cyclic shifter 63c and the fixed chip NRa generated by the code inversion/non-inversion switching circuit 63b as parallel data, adding the received fixed chip NRa to the received chip string CN1 to thereby generate a chip string CN2 (second chip string), and outputting the generated chip string CN2 as serial data.

Figure 8:
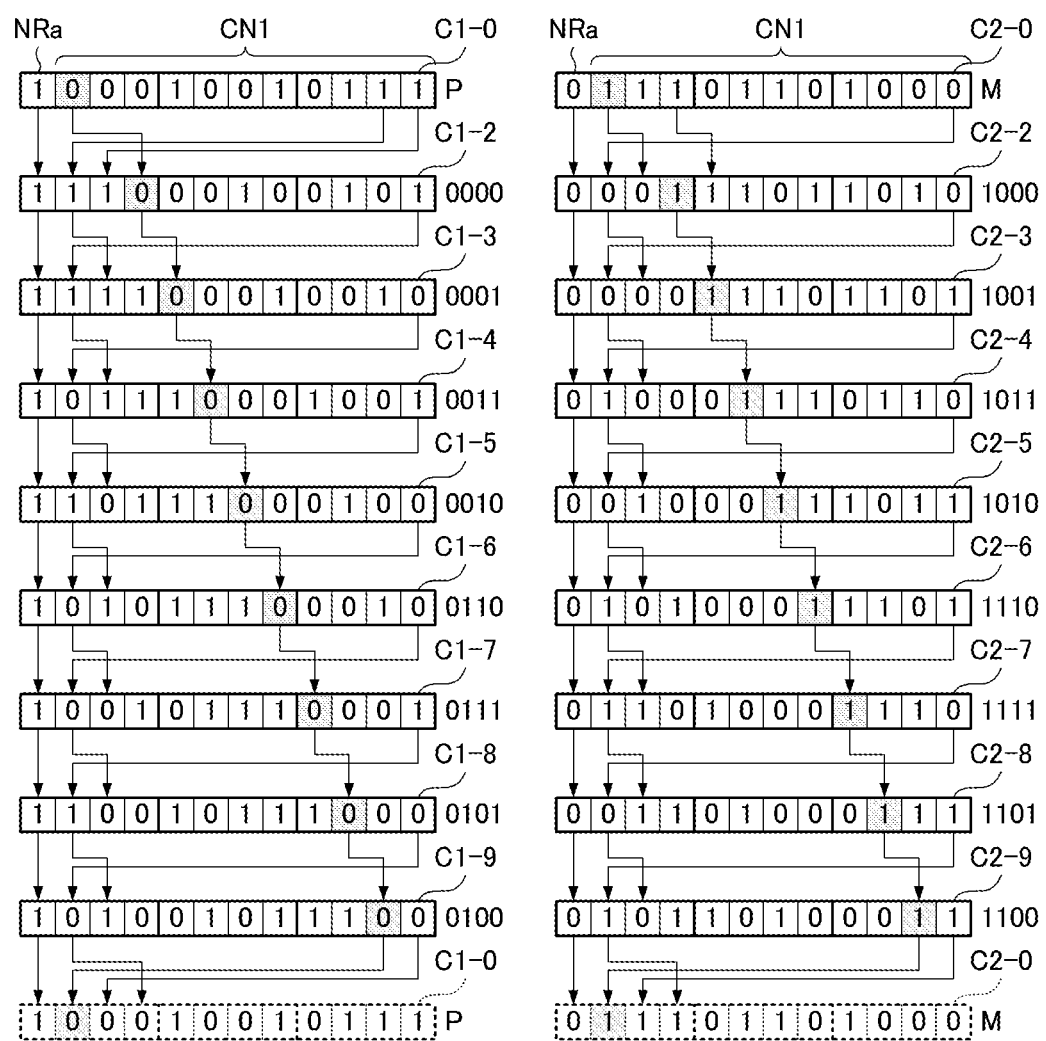
FIG. 8 is a diagram illustrative of a chip string CN2 output from a shift register 63d depicted in FIG. 6.

FIG. 8 is a diagram illustrative of the chip string CN2 output from the shift register 63d. A code string C1-0 depicted in FIG. 8 represents the chip string CN2 output from the shift register 63d if the code inversion/non-inversion switching circuit 63b does not perform its inverting process and the cyclic shifter 63c does not cyclically shift the supplied code string (when the shift quantity SA is "0"), and includes the spread code PN "00010010111" with the fixed code NR "1" added to the beginning thereof. A code string C1-n is a code string produced by cyclically shifting the chip string CN1 part of the code string C1-0 by a shift quantity n, and represents the chip string CN2 output from the shift register 63d if the code inversion/non-inversion switching circuit 63b does not perform its inverting process and the cyclic shifter 63c cyclically shifts the supplied code string by the shift quantity n.

A code string C2-0 depicted in FIG. 8 represents the chip string CN2 output from the shift register 63d if the code inversion/non-inversion switching circuit 63b performs its inverting process and the cyclic shifter 63c does not cyclically shift the supplied code string (when the shift quantity SA is "0"), and includes an inverted code from the code string C1-0. A code string C2-n is a code string produced by cyclically shifting the chip string CN1 part of the code string C2-0 by a shift quantity n, and represents the chip string CN2 output from the shift register 63d if the code inversion/non-inversion switching circuit 63b performs its inverting process and the cyclic shifter 63c cyclically shifts the supplied code string by the shift quantity n.

Referring to FIGS. 9A and 9B again, FIG. 9A depicts a solid-line curve that represents correlation values between the code string C1-0 depicted in FIG. 8 and a code string produced by cyclically shifting a portion, except the fixed chip NRa, of the code string C1-0 by an arbitrary shift quantity. In addition, FIG. 9B depicts a solid-line curve that represents correlation values between the code string C1-0 depicted in FIG. 8 and a code string produced by cyclically shifting a portion, except the fixed chip NRa, of an inverted code (e.g., the code string C2-0 depicted in FIG. 8) by an arbitrary shift quantity. In either one of FIGS. 9A and 9B, a correlation value peak represented by the solid-line curve appears only at a shift quantity "0," as with the broken-line curve. This holds true for all the code strings C1-n, C2-n though not illustrated. Consequently, the stylus 2 that receives the code strings C1-n, C2-n can store the code strings C1-n, C2-n in advance and detect code strings C1-n, C2-n included in received chip strings by calculating correlation values between the stored code strings C1-n, C2-n and the received chip strings. The position detecting system 1 according to the present embodiment sends and receives the first control signal US_c1 and the second control signal US_c2, using such properties. Details of a detecting operation of the stylus 2 to detect the code strings C1-n, C2-n will be described later.

As depicted in FIG. 9A, the floor value of the correlation values (broken-line curve) calculated with respect to the spread code PN is "−1," whereas the floor value of the correlation values (solid-line curve) calculated with respect to the code string C1-0 is "0." Furthermore, as depicted in FIG. 9B, the floor value of the correlation values (broken-line curve) calculated with respect to the inverted code from the spread code PN is "+1," whereas the floor value of the correlation values (solid-line curve) calculated with respect to the inverted code from the code string C1-0 is "0." The floor value of the correlation values is "0" because the fixed chip NRa is placed at the beginning of the chip string CN2, making the number of positive chips and the number of negative chips equal to each other. Conversely, placing the fixed chip NRa at the beginning of the chip string CN2 makes the floor value of the correlation values equal to "0."

If the fixed chip NRa is not added to the spread code PN, then the distance between the floor value "−1" of the correlation values and the maximum value "+11" thereof is 10. If the fixed chip NRa is added to the spread code PN, then the distance between the floor value "0" of the correlation values and the maximum value "+12" thereof is 12.

Consequently, it can be said that decision errors on the reception side can be reduced by adding the fixed chip NRa to the spread code PN, making the floor value equal to "0." The position detector 3 according to the present embodiment makes it possible, from this standpoint, to reduce decision errors on the stylus 2 side.

Referring back to FIG. 6, the modulating circuit 63e carries out the secondary modulation process for generating a transmission signal including the first control signal US_c1 and the second control signal US_c2 based on the chip string CN2 generated by the shift register 63d. The secondary modulation process has been described in detail above. The transmission signal generated by the modulating circuit 63e according to the secondary modulation process reaches the sensor 30 via the transmission guard section 65 and the selecting section 40 depicted in FIG. 2, and is sent through the touch surface 3a (see FIG. 1) to the stylus 2 by the sensor 30.

The control circuit 63a is a functional block for controlling various parts of the spread processor 63. The functions performed by the control circuit 63a include a function to generate the fixed code NR and the inversion information II and supply them to the code inversion/non-inversion switching circuit 63b, and a function to generate the shift quantity SA and supply it to the cyclic shifter 63c.

Figure 7:
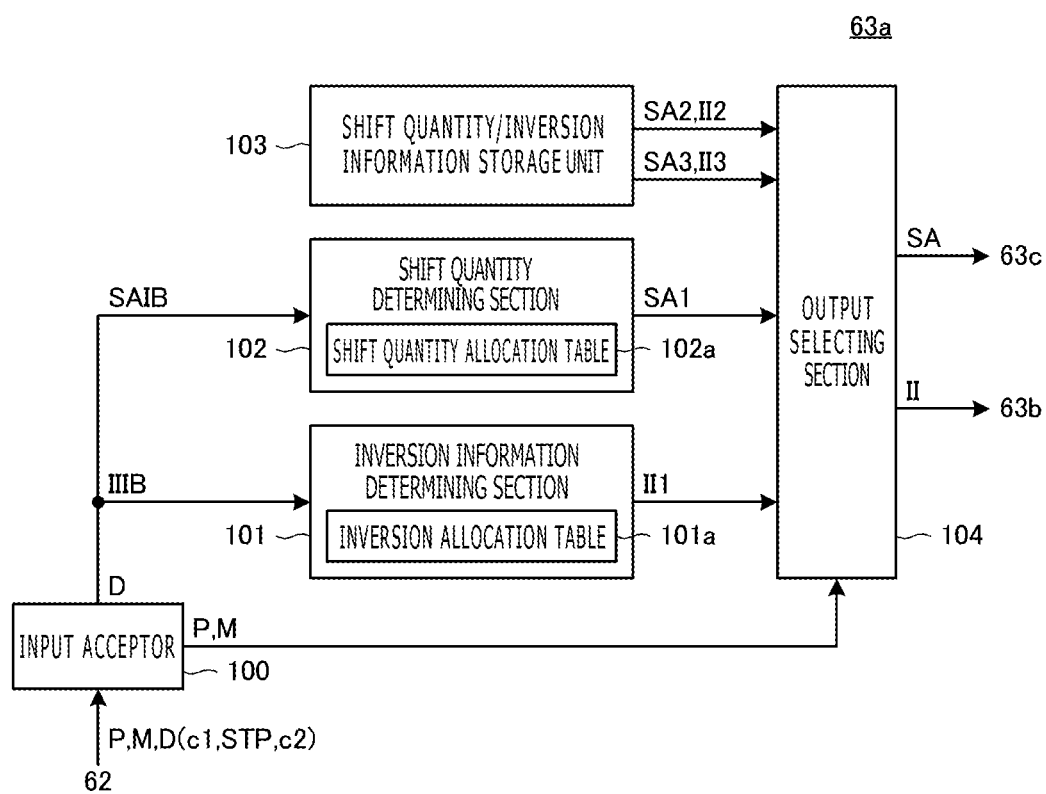
FIG. 7 is a block diagram depicting functional blocks of a control circuit 63a depicted in FIG. 6.

FIG. 7 is a block diagram depicting functional blocks of the control circuit 63a for generating the fixed code NR and the inversion information II. As depicted in FIG. 7, the control circuit 63a functionally has an input acceptor 100, an inversion information determining section 101, a shift quantity determining section 102, a shift quantity/inversion information storage unit 103, and an output selecting section 104.

The input acceptor 100 is a functional block for accepting the values P, M, D that make up the detection pattern c1, the delimiter pattern STP, and the control information c2 input from the switch 62 depicted in FIG. 2. If the input acceptor 100 accepts the value P or the value M input which is not associated with a particular bit string, then it supplies the accepted value to the output selecting section 104. If the input acceptor 100 accepts the value D (which is 4 bits long here) representing a bit string, it supplies the most significant bit thereof as an inversion information indicator bit IIIB (a second bit string which is 1 bit long that is to be sent to the stylus 2) to the inversion information determining section 101, and supplies the rest (three bits) as a shift quantity indicator bit string SAIB (a first bit string which has a predetermined bit length of 2 bits or more that is to be sent to the stylus 2) to the shift quantity determining section 102.

The inversion information determining section 101 is a functional block for determining first inversion information II1 based on the inversion information indicator bit IIIB supplied from the input acceptor 100. Specifically, the inversion information determining section 101 stores therein an inversion allocation table 101a depicted in Table 2 below, and determines first inversion information II1 according to the inversion allocation table 101a. The first inversion information II1 thus determined is supplied to the output selecting section 104.

TABLE 2

| Inversion information indicator bit IIIB | First inversion information II1 |
| --- | --- |
| 0 | Not to be inverted |
| 1 | To be inverted |

The shift quantity determining section 102 is a functional block for determining a first shift quantity SA1 based on the shift quantity indicator bit string SAIB supplied from the input acceptor 100. Specifically, the shift quantity determining section 102 stores therein a shift quantity allocation table 102a depicted in Table 3 below, and determines a first shift quantity SA1 according to the shift quantity allocation table 102a. The first shift quantity SA1 thus determined is supplied to the output selecting section 104.

TABLE 3

| Shift quantity indicator bit string SAIB | First shift quantity SA1 |
| --- | --- |
| 000 | 2 |
| 001 | 3 |
| 011 | 4 |
| 010 | 5 |
| 110 | 6 |
| 111 | 7 |
| 101 | 8 |
| 100 | 9 |

As can be understood from Table 3, the shift quantity determining section 102 according to the present embodiment first determines a value "2" as the first shift quantity SA1 for a bit string "000" (predetermined reference bit string). The value represented by "2" is a value produced by adding a predetermined value (=2) to a second shift quantity SA2 (=0) to be described later. With respect to each of a plurality of bit strings produced by successively incrementing the bit string "000" according to a predetermined criterion, values obtained by adding the number of incrementing to the first shift quantity SA1 (=2) determined for the bit string "000" are determined as the first shift quantity SA1. The predetermined criterion is given as the fact that the Hamming distance between a bit string to be incremented and a bit string that has been incremented is 1. The significance of why the above criterion is employed will be described later.

For example, a bit string that is obtained by incrementing the bit string "000" three times according to the above criterion is "010," and a first shift quantity SA1 to be allocated to the bit string "010" is "5" (=2+3) obtained by adding the number (=3) of incrementing to the first shift quantity SA1 (=2) determined for the bit string "000."

The shift quantity/inversion information storage unit 103 stores therein respective values of second inversion information II2, a second shift quantity SA2, third inversion information II3, and a third shift quantity SA3. Specifically, the shift quantity/inversion information storage unit 103 stores therein "not to be inverted" as the second inversion information II2, "0" as the second shift quantity SA2, "to be inverted" as the third inversion information II3, and "0" as the third shift quantity SA3.

In response to the value P supplied from the input acceptor 100, the output selecting section 104 supplies the second inversion information II2 and the second shift quantity SA2 stored in the shift quantity/inversion information storage unit 103 respectively as the inversion information II and the shift quantity SA to the code inversion/non-inversion switching circuit 63b and the cyclic shifter 63c, respectively, depicted in FIG. 6. The shift register 63d depicted in FIG. 6 now outputs the code string C1-0 depicted in FIG. 8 as the chip string CN2. Moreover, in response to the value M supplied from the input acceptor 100, the output selecting section 104 supplies the third inversion information II3 and the third shift quantity SA3 stored in the shift quantity/ inversion information storage unit 103 respectively as the inversion information II and the shift quantity SA to the code inversion/non-inversion switching circuit 63b and the cyclic shifter 63c, respectively, depicted in FIG. 6. The shift register 63d depicted in FIG. 6 now outputs the code string C2-0 depicted in FIG. 8 as the chip string CN2.

In response to neither of the values P, M supplied from the input acceptor 100 (i.e., in response to the value D input from the input acceptor 100), the output selecting section 104 supplies the first inversion information II1 determined by the inversion information determining section 101 as the inversion information II to the code inversion/non-inversion switching circuit 63b depicted in FIG. 6, and also supplies the first shift quantity SA1 determined by the shift quantity determining section 102 as the shift quantity SA to the cyclic shifter 63c depicted in FIG. 6. The shift register 63d depicted in FIG. 6 now outputs either one of the code strings C1-2 through C1-9 and C2-2 through C2-9 depicted in FIG. 8 as the chip string CN2. More specifically, if the inversion information II represents "not to be inverted," then the shift register 63d outputs a code string C1-SA, and if the inversion information II represents "to be inverted," then the shift register 63d outputs a code string C2-SA. FIG. 8 also illustrates an associated relationship between the bit string that is 4 bits long which is accepted by the input acceptor 100 and the chip string CN2 output by the shift register 63d. For example, if the bit string accepted by the input acceptor 100 is "0010," then the chip string CN2 output by the shift register 63d is the code string C1-5, i.e., "110111000100." Furthermore, if the bit string accepted by the input acceptor 100 is "1010," then the chip string CN2 output by the shift register 63d is the code string C2-5, i.e., "001000111011."

In this manner, the transmitter 60 can generate a transmission signal including a chip string CN2 that is obtained by cyclically shifting the spread code PN having autocorrelation characteristics by the shift quantity based on the value of a symbol to be sent, and inverting (or non-inverting) the cyclically shifted spread code PN, if necessary, as depicted in Table 1 above. As long as a chip string CN2 can be obtained, the order of the cyclically shifting process and the inverting or non-inverting process carried out by the transmitter 60 does not matter. Alternatively, the transmitter 60 may store the association between the values of symbols and chip strings CN2 or transmission signals including them as depicted in Table 1 in a memory, and may read and send a chip string CN2 stored in the memory each time the value of a symbol is input thereto.

FIG. 10 is a diagram depicting an example of the second control signal US_c2 that the position detector 3 sends to the stylus 2. In the example depicted in FIG. 10, the position detector 3 sends the value P successively twice to form the delimiter pattern STP as a preamble, and thereafter sends three values D1 "0" (0b0000), D2 "8" (0b1000), D3 "6" (0b0110) as the control information c2. For sending the value P, the shift register 63d outputs the code string C1-0, i.e., "100010010111," depicted in FIG. 8 as the chip string CN2. For sending the control information c2, the shift register 63d generates a chip string CN2 for each of the 4-bit values D1, D2, D3. For the first 4-bit value D1, since the corresponding bit string is "0000," the shift register 63d generates the code string C1-2, i.e., "111000100101," depicted in FIG. 8 as the chip string CN2. For the next 4-bit bit string D2, since its content is "1000," the shift register 63d generates the code string C2-2, i.e., "000111011010," depicted in FIG. 8 as the chip string CN2. For the last 4-bit bit string D3, since its content is "0110," the shift register 63d generates the code string C1-6, i.e., "101011100010," depicted in FIG. 8 as the chip string CN2.

Part or all of the bit string D3 that is the last one value (4-bit value) of the control information c2, for example, may include an error-correcting code calculated based on the bit strings D1 and D2, which precede the bit string D3. In this manner, the stylus 2 on the reception side is able to detect or correct a bit error generated in the bit strings D1 and D2 using the error-correcting code.

The criterion "that the Hamming distance between a bit string to be incremented and a bit string that has been incremented is 1" used as the predetermined criterion for determining the first shift quantity SA1 will be described below. When the stylus 2 receives a chip string CN2, it may receive a chip string CN2 with the shift quantity shifted by 1. For example, such a case happens when although the position detector 3 has sent the code string C1-6 depicted in FIG. 8, the stylus 2 determines that it has received the code string C1-7. In order to correct the erroneous decision with the above error-correcting code, it is desirable that the difference between the bit string represented by the code string C1-6 and the bit string represented by the code string C1-7 should be as small as possible. According to the present embodiment, inasmuch as the above predetermined criterion is employed, the bit string represented by the code string C1-6 is "0110" and the bit string represented by the code string C1-7 is "0111," and the difference between them is only one bit. Even if an erroneous decision is made, it is only one bit different, and the error can be corrected by an error-correcting code capable of correcting one bit which is sent with the transmission of the command. By thus employing the criterion "that the Hamming distance between a bit string to be incremented and a bit string that has been incremented is 1" and adding the error-correcting code, therefore, signals can be sent which are robust against erroneous decisions about shift quantities.

Figure 11:
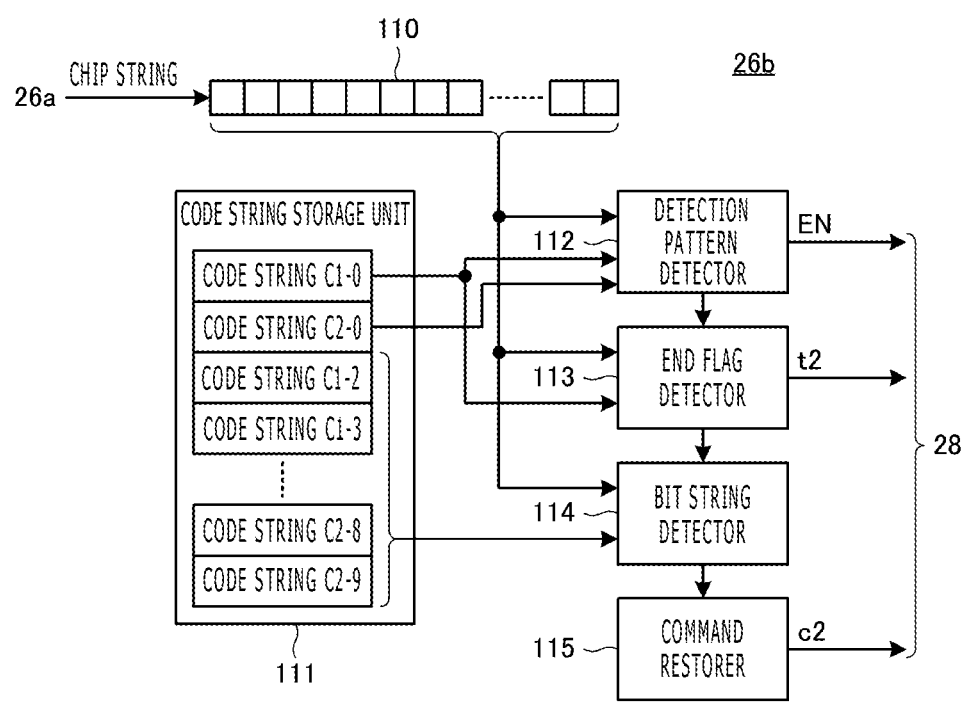
FIG. 11 is a block diagram depicting functional blocks of a correlating circuit 26b depicted in FIG. 4.

FIG. 11 is a block diagram depicting functional blocks of the correlating circuit 26b depicted in FIG. 4. As depicted in FIG. 11, the correlating circuit 26b has a shift register 110, a code string storage unit 111, a detection pattern detector 112, a delimiter pattern detector 113 (preamble detector), a bit string detector 114, and a command restorer 115.

The shift register 110 includes a first-in, first-out register for accepting a series of chips acquired by the demodulating circuit 26a, bit by bit, and is configured to be able to accumulate 12 chips. When more than 12 chips are input to the shift register 110, older ones are successively deleted from the shift register 110.

The code string storage unit 111 stores a plurality of code strings that are obtained by cyclically shifting a predetermined code string having autocorrelation characteristics by arbitrary shift quantities. Specifically, code strings that need to be stored in the code string storage unit 111 are all code strings that can possibly be sent by the position detector 3. Therefore, the code string storage unit 111 according to the present embodiment may store the code strings C1-0, C1-2 through C1-9, C2-0, and C2-2 through C2-9 depicted in FIG. 8.

The detection pattern detector 112, which has an internal timer (not depicted), is a functional block for performing a detecting operation to detect the detection pattern c1 included in a series of chips output from the demodulating circuit 26a in case the timer indicates that the present time is within a reception period SRP depicted in FIG. 5. In the detecting operation, specifically, each time a new chip is input to the shift register 110, the detection pattern detector 112 calculates correlation values between the chip string temporarily accumulated in the shift register 110 and those code strings which correspond to the values P, M of the detection pattern c1, among the code strings stored in the code string storage unit 111, specifically, the code string C1-0 and the code string C2-0. Then, when the correlation value with the code string C1-0 represents a peak value, the detection pattern detector 112 determines that it has detected the value P, and when the correlation value with the code string C2-0 represents a peak value, the detection pattern detector 112 determines that it has detected the value M. In response to alternately detecting the value P and the value M successively a predetermined number of times, the detection pattern detector 112 determines that it has detected the detection pattern c1, and issues the activation signal EN described above to the controller 28.

The delimiter pattern detector 113 is a functional block for starting a detecting operation to detect the delimiter pattern STP (preamble) included in a series of chips output from the demodulating circuit 26*a* in response to the detection of the detection pattern c1 by the detection pattern detector 112. In the detecting operation, specifically, each time a new chip is input to the shift register 110, the delimiter pattern detector 113 calculates a correlation value between the chip string temporarily accumulated in the shift register 110 and the code string which corresponds to the value P of the delimiter pattern STP, among the code strings stored in the code string storage unit 111, specifically, the code string C1-0. Then, when the calculated correlation value represents a peak value, the delimiter pattern detector 113 determines that it has detected the value P. In response to detecting the value P successively twice, the delimiter pattern detector 113 determines that it has detected the delimiter pattern STP, stops the detecting operation, and outputs detected time t2 described above to the controller 28.

The bit string detector 114 is a functional block for performing a detecting operation to detect the value D (a bit string that is 4 bits long) included in a series of chips output from the demodulating circuit 26*a* at a timing when the transmission and reception schedule generated by the controller 28 indicates that the present time is within the reception period of the control information c2. In the detecting operation, specifically, each time a new chip is input to the shift register 110, the bit string detector 114 calculates correlation values between the chip string temporarily accumulated in the shift register 110 and those code strings which correspond to the value D, among the code strings stored in the code string storage unit 111, specifically, the code string C1-2 through C1-9, C2-2 through C2-9. When any of the calculated values represents a peak value, the bit string detector 144 determines that it has detected the value D (a bit string that is 4 bits long) corresponding to the code string that indicates the peak value. The bit string detector 144 outputs the bit string which is the detected value D to the command restorer 115 each time.

The command restorer 115 is a functional block for joining bit strings successively supplied from the bit string detector 114 to restore the control information c2 sent by the position detector 3. The command restorer 115 is configured to output the restored control information c2 to the controller 28. The command set by the position detector 3 is thus supplied to the controller 28.

As described above, since the position detector 3 and the stylus 2 according to the present embodiment uses the cyclic shifting of code strings in generating a chip string CN2 to be sent by the position detector 3, it is possible to express 2 bits or more with one code string. Accordingly, it is possible to obtain a high bit rate at the same chip rate, compared with the background art where only 1 bit can be expressed by one code string.

Furthermore, because the chip string CN1 with the fixed chip NRa added thereto is used as the chip string CN2, detection errors on the reception side are reduced, reducing the possibility that a reception error will occur on the stylus 2 side.

For each of a plurality of bit strings produced by successively incrementing a predetermined reference bit string according to a predetermined criterion, a value obtained by adding the number of incrementing to a first shift quantity SA1 determined for the reference bit string is determined as a first shift quantity SA1, and the criterion "that the Hamming distance between a bit string to be incremented and a bit string that has been incremented is 1" is employed as the above predetermined criterion. Consequently, even if a chip string CN2 is received with the shift quantity shifted by 1, error correction due to erroneous decisions about a shift quantity can be kept to a 1-bit error, and hence can be realized by a shorter error-correcting code.

Although the preferred embodiment of the present disclosure has been described above, the present disclosure is not limited to the embodiment, but can be reduced to practice in various forms without departing from the scope thereof.

For example, in the above embodiment, 11-bit "00010010111" is used as the spread code PN. However, any code string can be used as the spread code PN insofar as it has autocorrelation characteristics. Though one spread code PN is used to send the value of one symbol, a plurality of (e.g., five) identical chip strings CN2 may be included with respect to the value of one symbol. Such a case is equivalent to the transmission of the value of the same symbol a plurality of times (i.e., five times), and erroneous decisions about a shift quantity can further be reduced by selecting a most probable shift quantity from a plurality of shift quantities.

Figure 12:
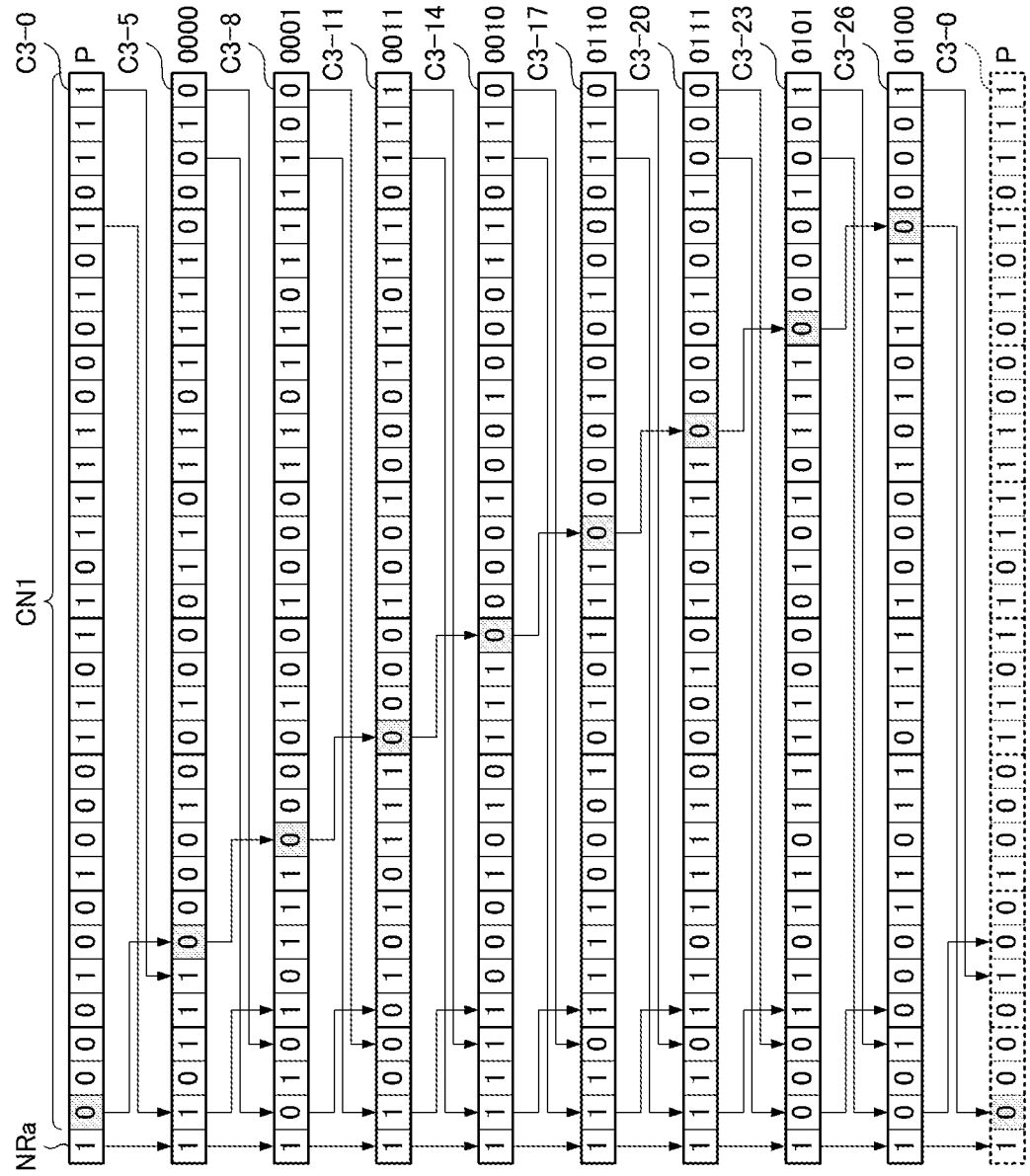
FIG. 12 is a diagram illustrative of a chip string CN2 output from the shift register 63d depicted in FIG. 6 according to a first modification of the embodiment of the present disclosure.
Figure 13:
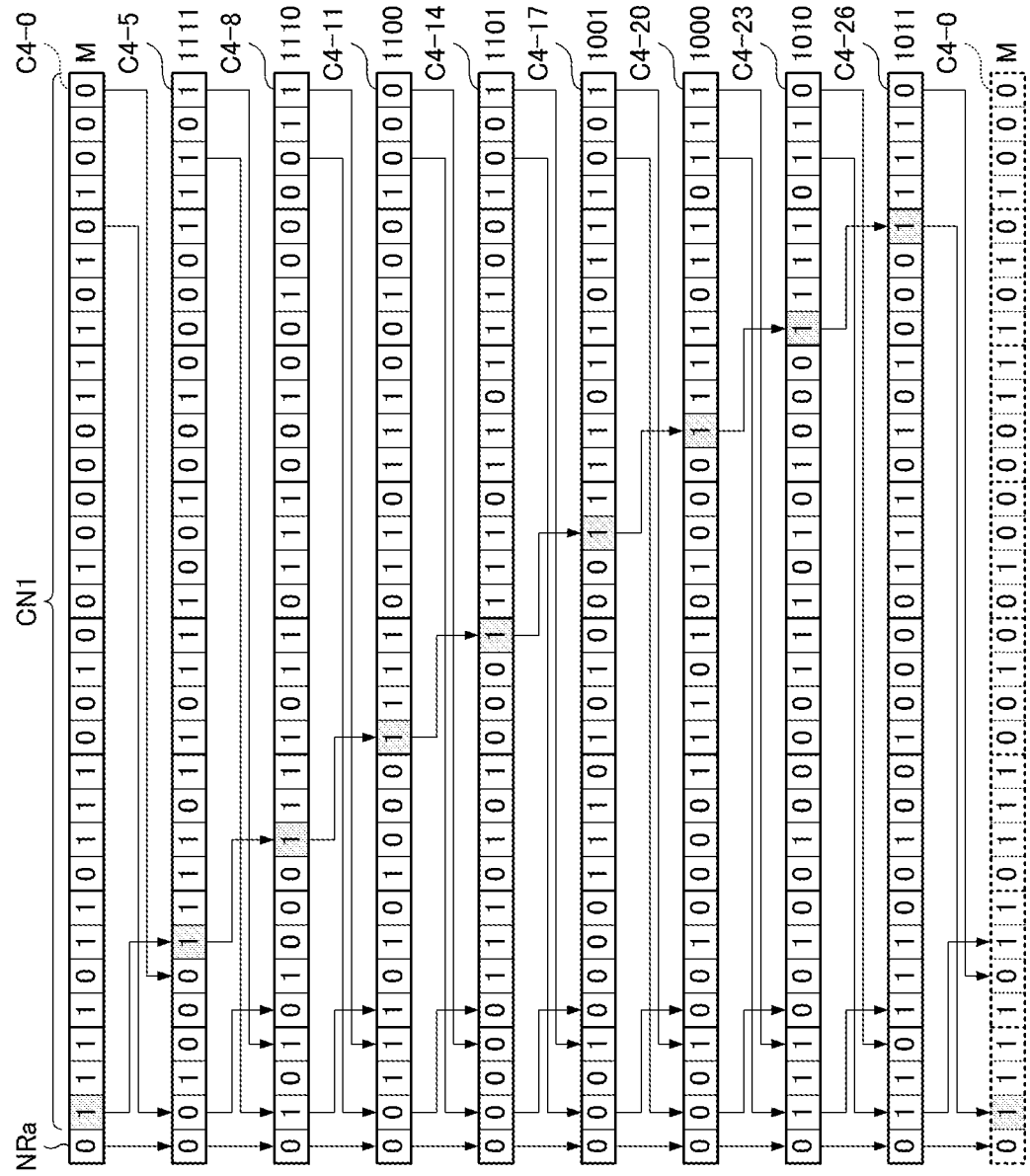
FIG. 13 is a diagram illustrative of a chip string CN2 output from the shift register 63d depicted in FIG. 6 according to the first modification of the embodiment of the present disclosure.

Table 4, Table 5, and FIGS. 12 and 13 are illustrative of chip strings CN2 output from the shift register 63*d* depicted in FIG. 6 according to a first modification of the above embodiment.

TABLE 4

| Values of symbols | Associated bit strings | Polarity | Shift quantity | Transmission signal (chip string CN2) |
|---|---|---|---|---|
| P | Unassociated | Non-inverted | 0 | 1_000010010001101 1011110001010111 |
| 0 | 0000 | Non-inverted | +5 | 1_101110000100100 0110110111100010 |
| 1 | 0001 | Non-inverted | +8 | 1_010101110000100 1000110110111100 |
| 3 | 0011 | Non-inverted | +11 | 1_100010101100001 0010001101101111 |
| 2 | 0010 | Non-inverted | +14 | 1_111100010101100 0010010001101101 |
| 6 | 0110 | Non-inverted | +17 | 1_110111100010101 1100001001000110 |
| 7 | 0111 | Non-inverted | +20 | 1_110110111100010 1011100001001000 |
| 5 | 0101 | Non-inverted | +23 | 1_000110110111100 0101011100001001 |
| 4 | 0100 | Non-inverted | +26 (−5) | 1_001000110110111 1000101011100001 |

TABLE 5

| Values of symbols | Associated bit strings | Polarity | Shift quantity | Transmission signal (chip string CN2) |
|---|---|---|---|---|
| M | Unassociated | Inverted | 0 (Reference) | 0_111101101110010 01000011101010000 |
| 8 | 1000 | Inverted | +5 | 0_010001111011011 1001001000011101 |
| 9 | 1001 | Inverted | +8 | 0_101010001111011 0111001001000011 |
| 11 | 1011 | Inverted | +11 | 0_011101010001111 0110111001001000 |
| 10 | 1010 | Inverted | +14 | 0_000011101010001 1110110111001001 |
| 14 | 1110 | Inverted | +17 | 0_001000011101010 0011110110111001 |
| 15 | 1111 | Inverted | +20 | 0_001001000011101 0100011110110111 |
| 13 | 1101 | Inverted | +23 | 0_111001001000011 1010100011110110 |
| 12 | 1100 | Inverted | +26 (−5) | 0_110111001001000 0111010100011110 |

According to the present modification, a bit string "0000100100011011011110001010111" that is 31 bits long is used as the spread code PN. This spread code PN has autocorrelation characteristics as with the 11-bit spread code PN used in the above embodiment.

According to the present modification, a shift quantity allocation table 102a is configured as depicted in Table 6 below. Table 6 is different from the shift quantity allocation table 102a depicted in Table 3 in that the first shift quantity SA1 determined for the reference bit string "000" is "5" (a value produced by adding 5 to the second shift quantity SA2 (=0)) rather than "2" and the number added to the first shift quantity SA1 (=5) is not the number of incrementing itself, but a number corresponding to the number of incrementing (specifically, "the number of incrementing" times 3). The values of the second inversion information II2 and the second shift quantity SA2 that are stored in the inversion allocation table 101a and the shift quantity/inversion information storage unit 103 are the same as those indicated in the above embodiment.

TABLE 6

| Shift quantity indicator bit string SAIB | First shift quantity SA1 |
|---|---|
| 000 | 5 |
| 001 | 8 |
| 011 | 11 |
| 010 | 14 |
| 110 | 17 |
| 111 | 20 |
| 101 | 23 |
| 100 | 26 |

According to the present modification, a code string C3-0 depicted in FIG. 12 corresponds to the value P, a code string C4-0 depicted in FIG. 13 corresponds to the value M, and code strings C3-5, C3-8, C3-11, C3-14, C3-17, C3-20, C3-23, and C3-26 depicted in FIG. 12 and code strings C4-5, C4-8, C4-11, C4-14, C4-17, C4-20, C4-23, and C4-26 depicted in FIG. 13 correspond to bit strings that are 4 bits long. The code string C3-0 includes the spread code PN "0000100100011011011110001010111" with a fixed code NR"1" added to the beginning thereof. A code string C3-n is a code string produced by cyclically shifting only part corresponding to the chip string CN1 of the code string C3-0 by a shift quantity n, a code string C4-0 is an inverted code from the code string C3-0, and a code string C4-n is a code string produced by cyclically shifting only part corresponding to the chip string CN1 of the code string C4-0 by a shift quantity n.

Even though the longer spread code PN is used, it is thus possible to express multiple values of 2 bits or more with one transmission signal as is the case with the above embodiment. Though the bit rate is lower to the extent that the spread code PN is now longer, since the difference between shift quantities for adjacent code strings is larger, it is possible to reduce the possibility that the stylus 2 will erroneously determine and detect a shift quantity (the value of a corresponding symbol). For example, even if a shift quantity is detected as +6 to the right, robust decoding can be carried out for the shift quantity error by determining the shift quantity as a value "0" which is originally +5 to the right. With a shift quantity being set to an odd number of 3 or more in the modification, a margin of the same discrete variant can preferably be provided in determining shift quantities, for example, by determining a shift quantity as a value "1" which is originally +8 to the right if the shift quantity is detected as +7 to the right and by determining a shift quantity as a value "0" which is originally +5 to the right if the shift quantity is detected as +5 to the right.

In the above modification, the difference between the closest shift quantities among the shift quantities for the bit train associated values 0 through 7 used in a command is 3. On the other hand, the difference between a shift quantity (i.e., 0) for the symbol value "P" used in the delimiter pattern STP such as a preamble or the like and the closest shift quantity (5 to the right) for the value "0" or the closest shift quantity (5 to the left) for the value "4" among the bit train associated values 0 through 7 used in a command is 5, which is large compared with 3 that represents the difference between the shift quantities for bit train associated values 0 through 7. Since the smallest difference (5) among the differences between the shift quantities based on the symbol values "P" and "M" used in the delimiter pattern STP such as a preamble or the like and the shift quantities based on the values that make up a command is thus larger than the smallest difference (3) among the differences between the shift quantity based on one value of a command and the shift quantity based on another value of the command, the probability that the delimiter pattern such as a preamble or the like will be determined in error as a predetermined value corresponding to a command is reduced.

In the above embodiment, the demodulating circuit 26a of the stylus 2 performs an inverted process of Manchester encoding. However, even though the spread processor 63 of the position detector 3 carries out Manchester encoding, the demodulating circuit 26a need not perform an inverted process of Manchester encoding. A processing operation of the stylus 2 in such a modification will be described below with reference to FIG. 14.

Figure 14:
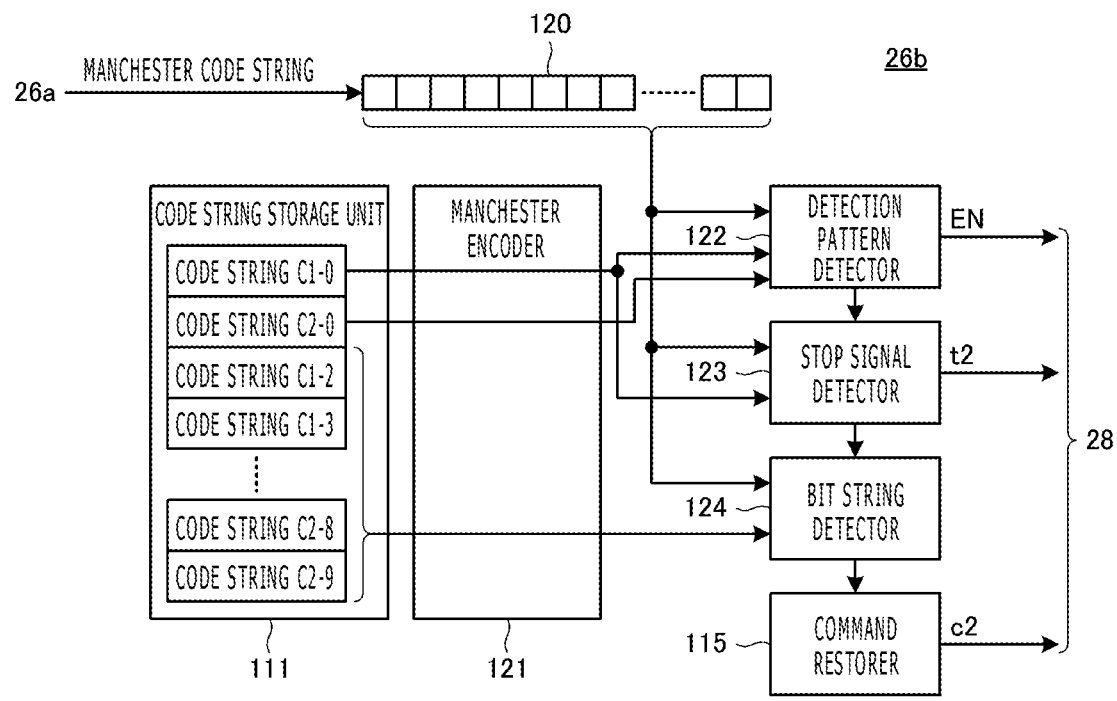
FIG. 14 is a block diagram depicting functional blocks of a correlating circuit 26b according to a second modification of the embodiment of the present disclosure.

FIG. 14 is a block diagram depicting functional blocks of a correlating circuit 26b according to a second modification of the above embodiment. As depicted in FIG. 14, the correlating circuit 26b according to the present modification has a shift register 120, a Manchester encoder 121, a detection pattern detector 122, a delimiter pattern detector 123 (preamble detector), and a bit string detector 124, in place of the shift register 110, the detection pattern detector 112, the delimiter pattern detector 113 (preamble detector), and the bit string detector 114 depicted in FIG. 11.

The shift register 120 is different from the shift register 110 according to the above embodiment, which is able to store only 12 chips, in that the shift register 120 is configured to be able to store 24 chips. This is because the number of chips that are input to the shift register 120 for one chip string CN2 increases to 24 as the demodulating circuit 26a does not perform an inverted process of Manchester encoding.

The Manchester encoder 121 is a functional block for Manchester-encoding a code string stored in the code string storage unit 111 when the code string is supplied to the detection pattern detector 122, the delimiter pattern detector 123, and the bit string detector 124. Therefore, the detection pattern detector 122, the delimiter pattern detector 123, and the bit string detector 124 are supplied with the Manchester-encoded code string.

The detection pattern detector 122, the delimiter pattern detector 123, and the bit string detector 124 are different respectively from the detection pattern detector 112, the delimiter pattern detector 113, and the bit string detector 114 in that they are configured to calculate correlation values between a chip string that is 24 chips long which is temporarily accumulated in the shift register 120 and the code string that is 24 chips long which has been Manchester-encoded. The other details of the detection pattern detector 122, the delimiter pattern detector 123, and the bit string detector 124 are the same as those of the detection pattern detector 112, the delimiter pattern detector 113, and the bit string detector 114.

A Manchester-encoded code string usually does not exhibit the clean autocorrelation characteristics (autocorrelation characteristics whose floor values are the same) depicted in FIGS. 9A and 9B. However, since its peak value can be detected, the detection pattern detector 122, the delimiter pattern detector 123, and the bit string detector 124 are able to detect a detection pattern c1, a delimiter pattern STP, and a bit string that is 4 bit long, respectively, according to the above process.

In the above embodiment, it has been described that the position detector 3 sends the second control signal US_c2 following the first control signal US_c1, as depicted in FIG. 5. However, after having sent the first control signal US_c1 (specifically, a chip string CN2 corresponding to the delimiter pattern STP), the position detector 3 may send the second control signal US_c2 (specifically, a chip string CN2 corresponding to the control information c2) after the elapse of a predetermined time period longer than 0.

Figure 15:
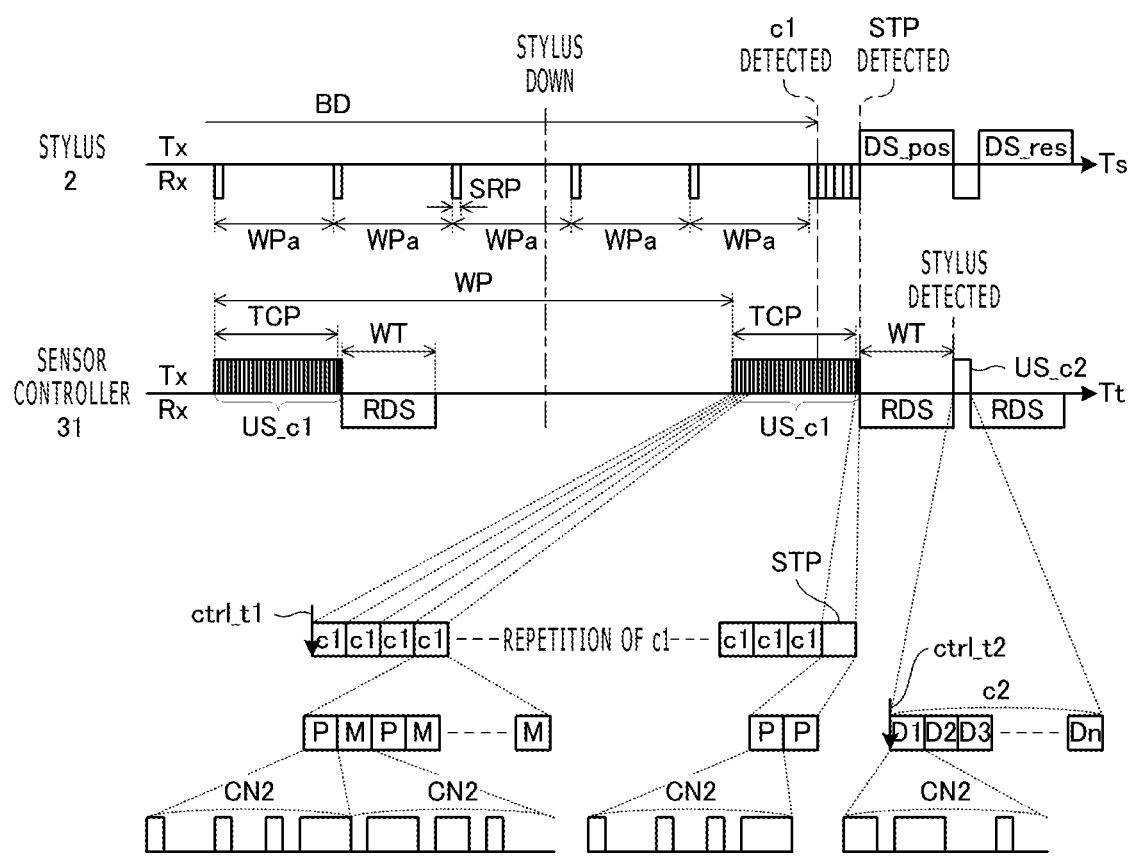
FIG. 15 is a timing chart illustrative of a chronological sequence of operation of a stylus 2 and a sensor controller 31 according to a third modification of the embodiment of the present disclosure.

FIG. 15 is a timing chart illustrative of a chronological sequence of operation of a stylus 2 and a sensor controller 31 according to a third modification of the above embodiment. A position detector 3 depicted in FIG. 15 is different from the position detector 3 according to the above embodiment in that it does not send the second control signal US_c2 following the first control signal US_c1, but provides a reception period RDS having a predetermined time length WT after having sent the first control signal US_c1, and sends the second control signal US_c2 only if the position signal DS_pos is received during the reception period RDS. Even though the gap is provided between the first control signal US_c1 and the second control signal US_c2, as long as the time length of the gap is determined in advance, the stylus 2 can determine a transmission and reception schedule while taking the gap into account, and hence can receive the second control signal US_c2 without any problems.

In the above embodiment, one chip string CN2 is assigned to 4 bits. However, the number of bits that can be assigned to one chip string CN2 is not limited to 4. Particularly, if long code strings as depicted in FIGS. 12 and 13 are used, one code string may represent more bits.

In the above embodiment, the detection pattern c1 and the delimiter pattern STP are represented by the dedicated code strings C1-0, C2-0. However, they may be represented by code strings which are the same as code strings for bit strings. If the code strings C1-0, C2-0 are dedicated to the detection pattern c1 and the delimiter pattern STP, then as depicted in FIG. 8, detection errors are reduced in detecting the detection pattern c1 and the delimiter pattern STP by making the differences (2 in FIG. 8) between the shift quantities for the code string C1-0 (or the code string C2-0) and the adjacent code strings C1-1, C1-9 (or the code strings C2-1, C2-9) larger than the differences (1 in FIG. 8) between the shift quantities for the code strings C1-$n$ (or the code strings C2-$n$) ($n \neq 1$), although code strings that can be used for sending bit strings are reduced. However, using code strings which are the same as code strings for bit strings as the delimiter pattern STP, as described above, is advantageous in that code strings that can be used for sending bit strings are increased.

In the above embodiment, a chip string CN1 with a fixed chip NRa added thereto is used as a chip string CN2. However, if no problem arises from noise caused by the fact that the floor value of correlation values is not "0," then a chip string CN1 may be used directly as a chip string CN2.

In the above embodiment, a chip string CN1 with a fixed chip NRa added to the beginning thereof is used as a chip string CN2. However, a chip string CN2 may be made up of a chip string CN1 and a fixed chip NRa added to the tail end of the chip string CN1.

In the above embodiment, an example in which the detection pattern c1 is sent before the delimiter pattern STP has been described. However, if the stylus 2 may perform its receiving operation continuously rather than intermittently, then the transmission of the detection pattern c1 may be omitted. In such a case, the stylus 2 detects the position detector 3 by detecting the delimiter pattern STP.

In the above embodiment, the present disclosure is applied to signals that the position detector 3 sends to the stylus 2. However, the present disclosure is also applicable to signals that the stylus 2 sends to the position detector 3.

In the above embodiment, the spread processor 63 includes the code inversion/non-inversion switching circuit 63b and the cyclic shifter 63c, so that code strings are inverted and cyclically shifted in the spread processor 63. However, the spread processor 63 may be configured such that it stores the values of symbols that may possibly be input to the control circuit 63a and chip strings CN2 to be output in an associated relationship in a storage area, and generates a chip string CN2 corresponding to the value of an input symbol by reading it from the storage area.

DESCRIPTION OF REFERENCE SYMBOLS

1 Position detecting system
2 Stylus
3 Position detector
3a Touch surface
20 Core
20a Distal end
21 Electrode
23 Pen pressure detection sensor
24 Circuit unit
25 Power supply
26 Receiver
26a Demodulating circuit
26b Correlating circuit
27 Transmitter
27a Modulation circuit
27b Voltage boosting circuit 28 Controller
30 Sensor
30X, 30Y Line-shaped electrode
31 Sensor controller
32 Host processor
40 Selecting section
41x, 41y Conductor selecting circuit
44x, 44y Switch
50 Receiver
51 Amplifying circuit
52 Detecting circuit
53 Analog-to-digital converter
60 Transmitter
61 Control signal supply section
62 Switch
63 Spread processor
63a Control circuit
63b Code inversion/non-inversion switching circuit
63c Cyclic shifter
63d Shift register
63e Modulating circuit
64 Code string hold section
65 Transmission guard section
70 Logic unit
80 MCU
100 Input acceptor
101 Inversion information determining section
101a Inversion allocation table
102 Shift quantity determining section
102a Shift quantity allocation table
103 Shift quantity/inversion information storage unit
104 Output selecting section
110 Shift register
111 Code string storage unit
112 Detection pattern detector
113 Delimiter pattern detector
114 Bit string detector
115 Command restorer
120 Shift register
121 Manchester encoder
122 Detection pattern detector
123 Delimiter pattern detector
124 Bit string detector
c1 Detection pattern
c2 Control information
CN1, CN2 Chip string
DS Downlink signal
DS_pos Position signal
DS_resData signal
EN Activation signal
II Inversion information
II1 First inversion information
II2 Second inversion information
IIIB Inversion information indicator bit
NR Fixed code
NRa Fixed chip
PN Spread code
PNa Code string
SA Shift quantity
SA1 First shift quantity
SA2 Second shift quantity
SAIB Shift quantity indicator bit string
STP Delimiter pattern
SW Switching section
US Uplink signal
US_c1 First control signal
US_c2 Second control signal

The invention claimed is:

1. A sensor controller for use in a position detector for detecting a position of a position indicator on a touch surface, comprising:
   a controller which, in operation, outputs a value of a symbol to be sent to the position indicator; and
   a transmitter coupled to the controller and which, in operation, generates a transmission signal including a first chip string produced by cyclically shifting a spread code having autocorrelation characteristics by a shift quantity based on the value of the symbol to be sent, and sends the generated transmission signal to the position indicator via the touch surface,
   wherein the symbol represents a bit string, which has a predetermined bit length of 2 bits or more and forms a command indicating a content of an instruction for the position indicator.

2. The sensor controller according to claim 1, wherein the symbol takes multiple values, and
   the transmission signal represents the value of the symbol out of the multiple values based on the shift quantity and non-inversion and inversion of the spread code.

3. The sensor controller according to claim 2, wherein the symbol takes any one of a total number of values wherein the total number is indicated by a power of 2, or takes any one of 1 or more values respectively different from any one of the total number of values.

4. The sensor controller according to claim 3, wherein the total number of values respectively form commands, each indicating a content of an instruction for the position indicator, and
   the 1 or more values respectively different from any one of the total number of values respectively form preambles, each indicating a start of the command.

5. The sensor controller according to claim 4, wherein the controller controls the transmitter to send, prior to the command, the preamble serving as a reference based on which non-inversion or inversion is determined for a signal modulated with one of the total number of values.

6. The sensor controller according to claim 4, wherein the controller controls the transmitter to send, prior to the command, the preamble serving as a reference based on which non-inversion or inversion is determined for a signal modulated with one of the 1 or more values respectively different from any one of the total number of values.

7. The sensor controller according to claim 4, wherein the smallest difference among differences between shift quantities based on the values that form the preambles and shift quantities based on the values that form the commands is larger than the smallest difference among the differences between a shift quantity based on one of the values that forms the command and a shift quantity based on another one of the values that forms the command.

8. The sensor controller according to claim 1, wherein the transmission signal includes a second chip string including the first chip string and a fixed chip added to a beginning end or a tail end of the first chip string.

9. The sensor controller according to claim 8, wherein a number of positive chips included in the second chip string is equal to a number of negative chips included in the second chip string.

10. The sensor controller according to claim 8, wherein the transmitter holds the value of the symbol and the second chip string in an associated relationship in a storage area, and obtains the transmission signal from the storage area.

11. The sensor controller according to claim 1, wherein the shift quantity is configured such that the smaller a Hamming distance is between a bit string with which a value of one symbol is associated and a bit string with which a value of another symbol is associated, the smaller a difference is between a shift quantity for the value of the one symbol and a shift quantity for the value of the another symbol.

* * * * *

UNITED STATES PATENT AND TRADEMARK OFFICE
CERTIFICATE OF CORRECTION

PATENT NO. : 10,852,895 B2
APPLICATION NO. : 16/659451
DATED : December 1, 2020
INVENTOR(S) : Yasuo Oda et al.

It is certified that error appears in the above-identified patent and that said Letters Patent is hereby corrected as shown below:

On the Title Page

Item (30), Foreign Application Priority Data:
-- Mar. 16, 2016 (JP) ..... PCT/JP2016/058254 --, was omitted from the patent.

Signed and Sealed this
Thirteenth Day of December, 2022

Katherine Kelly Vidal
*Director of the United States Patent and Trademark Office*